(12) United States Patent
Mayer

(10) Patent No.: US 10,900,230 B2
(45) Date of Patent: Jan. 26, 2021

(54) SUSPENSION CEILING WITH PARALLEL VANES FOR BUILDING STRUCTURES

(71) Applicant: CERTAINTEED CEILINGS CORPORATION, Malvern, PA (US)

(72) Inventor: Richard Mayer, Brighton, CO (US)

(73) Assignee: CertainTeed Ceilings Corporation, Malvern, PA (US)

( * ) Notice: Subject to any disclaimer, the term of this patent is extended or adjusted under 35 U.S.C. 154(b) by 0 days.

(21) Appl. No.: 16/296,665

(22) Filed: Mar. 8, 2019

(65) Prior Publication Data

US 2019/0203466 A1 Jul. 4, 2019

Related U.S. Application Data

(60) Continuation of application No. 14/701,872, filed on May 1, 2015, now Pat. No. 10,227,776, which is a
(Continued)

(51) Int. Cl.
| | |
|---|---|
| *E04B 9/04* | (2006.01) |
| *E04B 9/24* | (2006.01) |
| *E04B 9/36* | (2006.01) |
| *F21V 33/00* | (2006.01) |
| *E04B 9/06* | (2006.01) |
| *F21Y 103/10* | (2016.01) |
| *F21Y 115/10* | (2016.01) |
| *F16B 7/18* | (2006.01) |

(Continued)

(52) U.S. Cl.
CPC ............... *E04B 9/04* (2013.01); *E04B 9/065* (2013.01); *E04B 9/245* (2013.01); *E04B 9/247* (2013.01); *E04B 9/366* (2013.01); *F21V 33/006* (2013.01); *E04B 9/064* (2013.01); *E04B 9/225* (2013.01); *E04B 9/34* (2013.01); *F16B 7/187* (2013.01); *F21S 2/00* (2013.01); *F21Y 2103/00* (2013.01); *F21Y 2103/10* (2016.08); *F21Y 2115/10* (2016.08)

(58) Field of Classification Search
CPC . E04B 9/04; E04B 9/065; E04B 9/245; E04B 9/247; E04B 9/366; E04B 9/064; E04B 9/225; E04B 9/34; F21V 33/006; F21Y 2103/10; F21Y 2103/00; F21S 2/00
See application file for complete search history.

(56) References Cited

U.S. PATENT DOCUMENTS 1,245,414 A * 11/1917 Widmer ................ E04B 1/4107
52/699
1,261,146 A 4/1918 Marble
(Continued)

FOREIGN PATENT DOCUMENTS

| EP | 0049431 | 4/1982 | |
|---|---|---|---|
| EP | 0049431 A2 * | 4/1982 | ............. E04B 9/183 |
| JP | 5280134 | 10/1993 | |

*Primary Examiner* — Adriana Figueroa
(74) *Attorney, Agent, or Firm* — Dority & Manning, P.A.

(57) ABSTRACT

A suspended ceiling system for a building structure includes a plurality of parallel struts for supporting a plurality of parallel vanes suspended from the struts in perpendicular relationship thereto. The vanes can be suspended in downwardly spaced relationship to the struts or in contiguous relationship therewith and occur in different forms including illuminated vanes, adjustable vanes and the like.

20 Claims, 23 Drawing Sheets

Related U.S. Application Data division of application No. 13/595,043, filed on Aug. 27, 2012, now Pat. No. 9,038,344.

(60) Provisional application No. 61/527,729, filed on Aug. 26, 2011.

(51) Int. Cl.
| | |
|---|---|
| E04B 9/22 | (2006.01) |
| E04B 9/34 | (2006.01) |
| F21S 2/00 | (2016.01) |
| F21Y 103/00 | (2016.01) |

(56) References Cited

U.S. PATENT DOCUMENTS

| | | | |
|---|---|---|---|
| 2,659,807 A * | 11/1953 | Wakefield | E04B 9/34 |
| | | | 362/150 |
| 2,676,680 A * | 4/1954 | Kindorf | E04B 9/183 |
| | | | 403/22 |
| 2,753,440 A * | 7/1956 | Wakefield | F21V 17/00 |
| | | | 362/150 |
| 3,483,910 A * | 12/1969 | Van Huffel | F16B 37/046 |
| | | | 411/112 |
| 4,146,074 A * | 3/1979 | Kowalski | F16B 37/046 |
| | | | 411/111 |
| 4,163,350 A * | 8/1979 | Doguchi | E04B 9/001 |
| | | | 52/241 |
| 4,545,166 A | 10/1985 | Kielmeyer | |
| 4,575,295 A * | 3/1986 | Rebentisch | F16B 37/046 |
| | | | 411/427 |
| 4,662,590 A | 5/1987 | Hungerford, Jr. | |
| 4,784,552 A | 11/1988 | Rebentisch | |
| 4,901,958 A * | 2/1990 | Kelso | F16L 3/11 |
| | | | 248/59 |
| 4,905,952 A | 3/1990 | Pinquist | |
| 4,917,553 A * | 4/1990 | Muller | F16B 37/046 |
| | | | 411/104 |
| 4,948,313 A | 8/1990 | Zankovich | |
| 5,078,537 A | 1/1992 | Nomura | |
| 5,118,069 A * | 6/1992 | Muhlethaler | E04B 9/18 |
| | | | 248/613 |
| 5,279,632 A * | 1/1994 | Decker | B01D 46/0005 |
| | | | 52/506.06 |
| 6,511,522 B1 | 1/2003 | Gomez et al. | |
| 7,246,547 B2 | 7/2007 | Van Walraven | |
| 7,287,733 B2 | 10/2007 | Bongio et al. | |
| 7,410,141 B2 | 8/2008 | Hartwick | |
| 7,594,787 B2 | 9/2009 | Womack et al. | |
| 7,617,649 B2 | 11/2009 | Arakawa | |
| 7,886,496 B1 * | 2/2011 | Spransy | E04B 9/006 |
| | | | 52/220.6 |
| 9,038,344 B2 | 5/2015 | Mayer | |
| 2003/0185643 A1 | 10/2003 | Thompson | |
| 2006/0249633 A1 | 11/2006 | Korczak et al. | |
| 2010/0103654 A1* | 4/2010 | Yasuda | E04B 9/006 |
| | | | 362/147 |
| 2010/0124457 A1 | 5/2010 | Cook et al. | |

\* cited by examiner

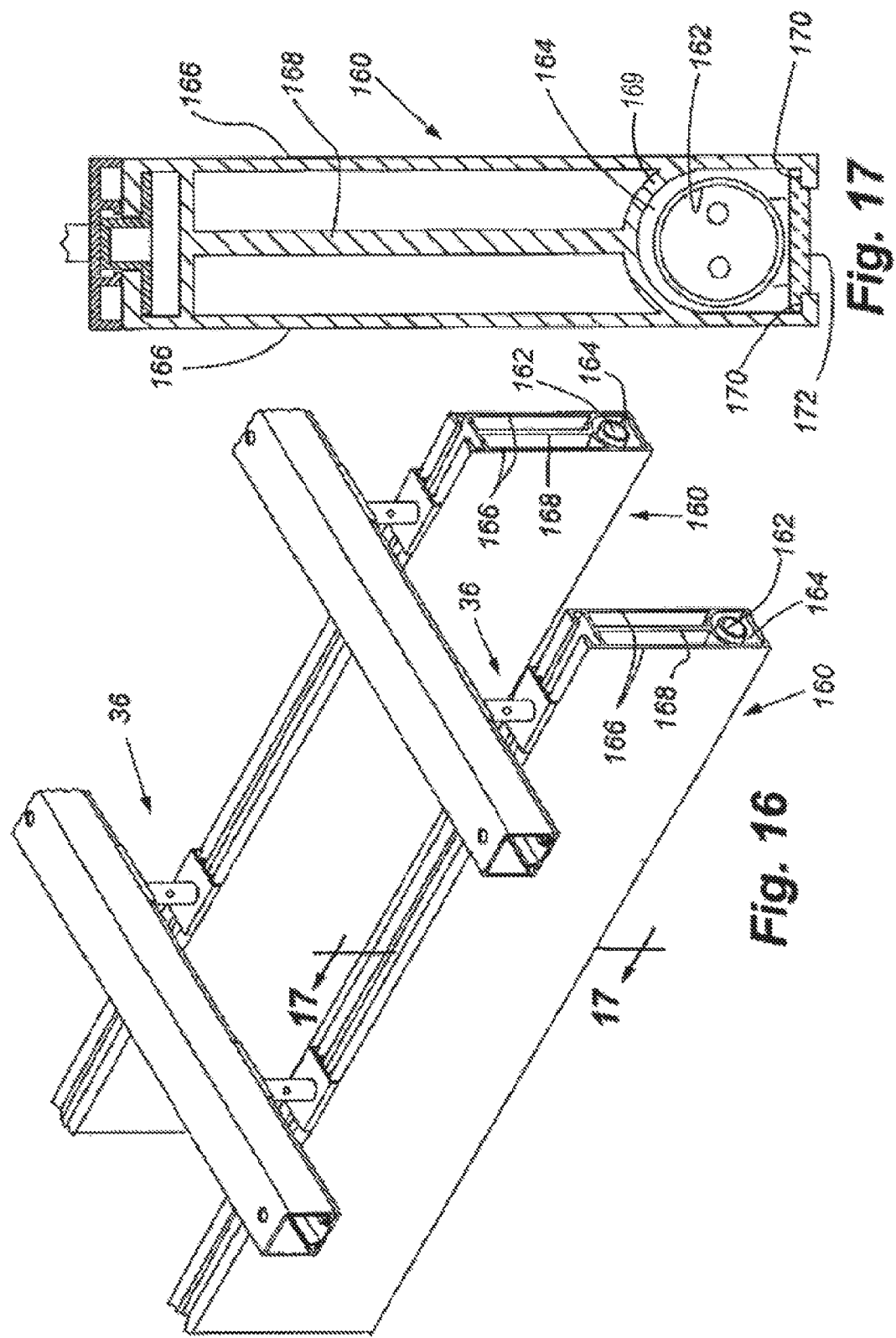

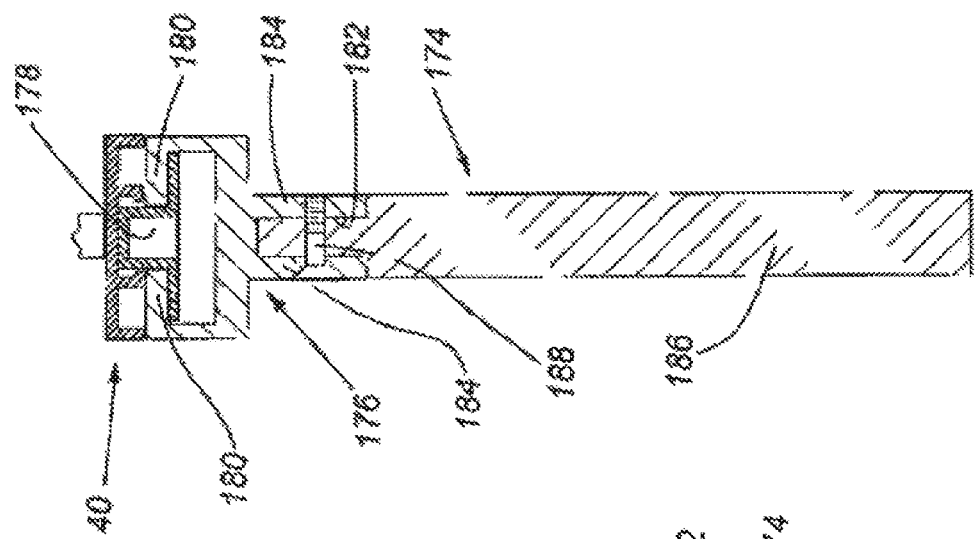
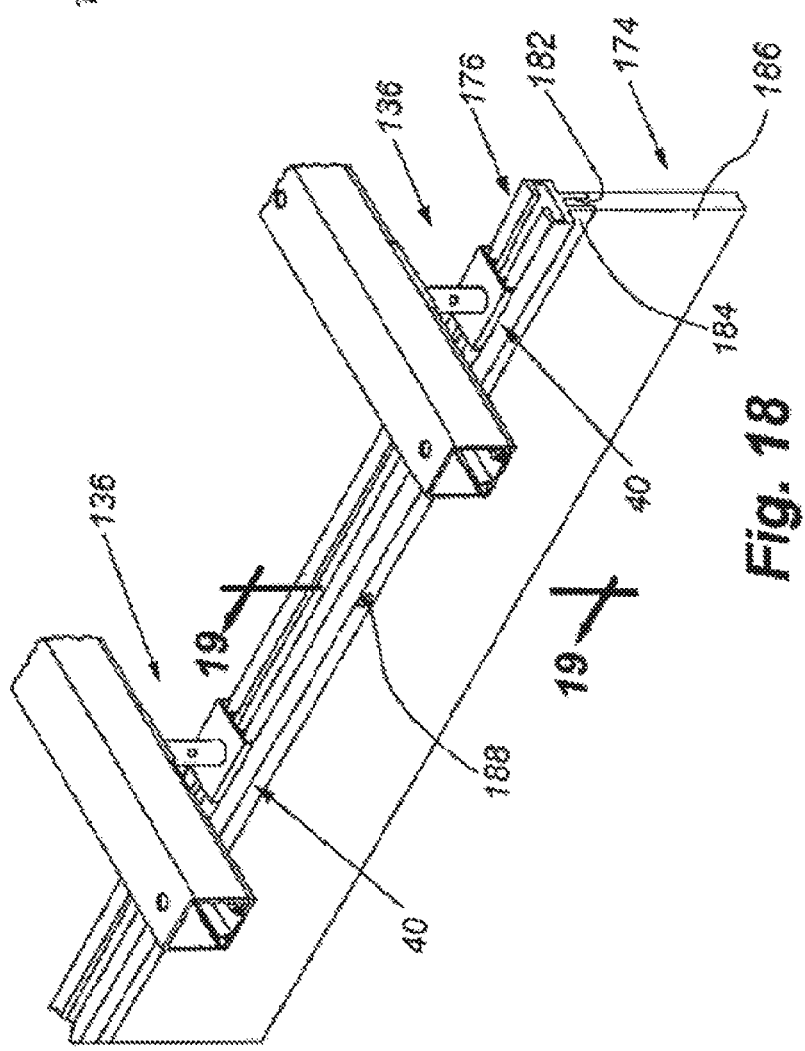

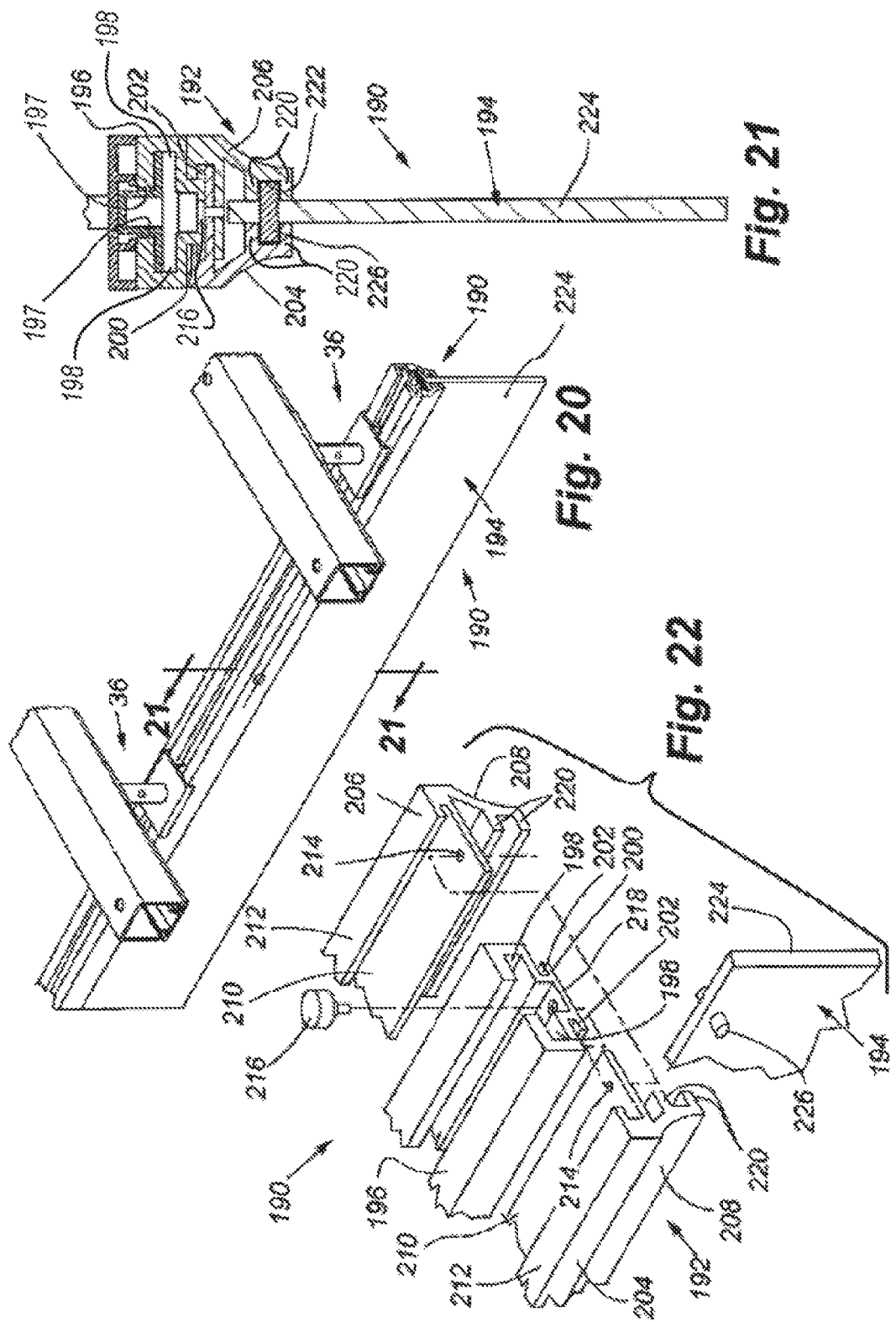

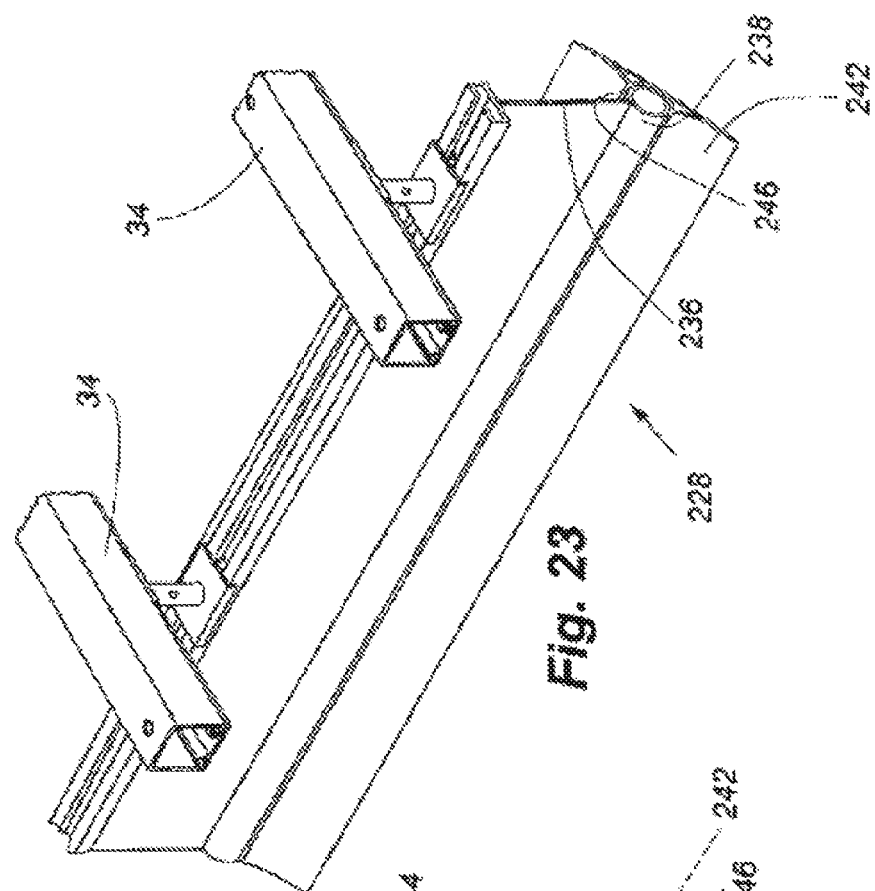
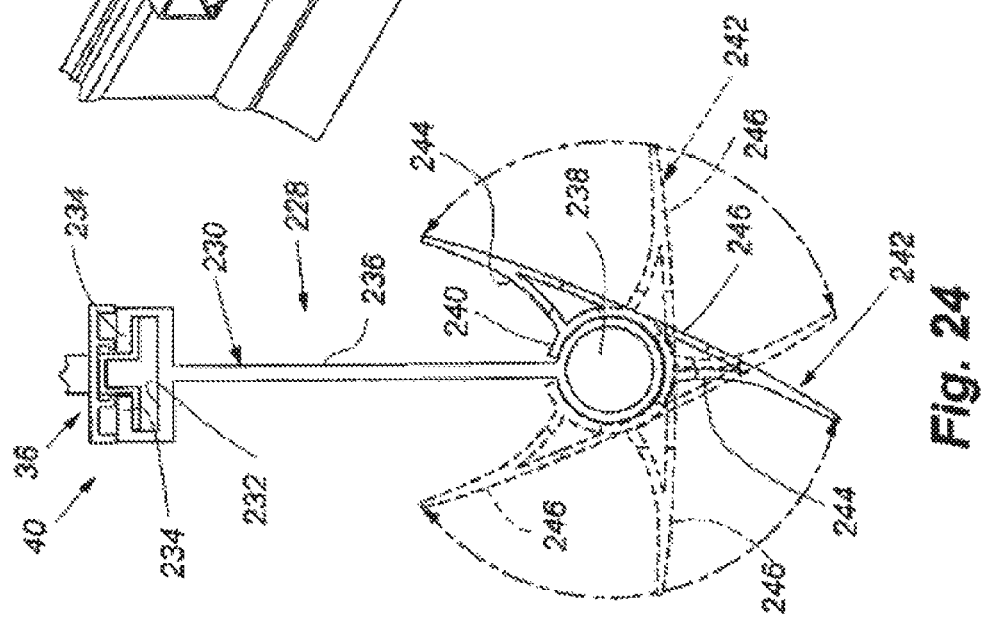

SUSPENSION CEILING WITH PARALLEL VANES FOR BUILDING STRUCTURES

The present application is a continuation of co-pending U.S. patent application Ser. No. 14/701,872 filed on May 1, 2015, which is a divisional of U.S. patent application Ser. No. 13/595,043 filed on Aug. 27, 2012 (issued as U.S. Pat. No. 9,038,344) and entitled "Suspension Ceiling With Parallel Vanes for Building Structures", which, in turn, claims the benefit under 35 U.S.C. 119(e) of U.S. Provisional Application No. 61/527,729 filed Aug. 26, 2011, all of which are hereby incorporated by reference herein in their entireties for all purposes.

CROSS-REFERENCE TO RELATED APPLICATIONS

The present application is a divisional of co-pending U.S. patent application Ser. No. 13/595,043 filed on Aug. 27, 2012 and entitled "Suspension Ceiling With Parallel Vanes For Building Structures", which claims the benefit under 35 U.S.C. 119(e) of U.S. Provisional Application No. 61/527,729 filed Aug. 26, 2011, which are hereby incorporated by reference herein in their entireties.

FIELD

The present disclosure relates generally to drop ceilings for use in building structures and particularly such a drop ceiling where a plurality of parallel vanes are suspended from parallel struts mounted within the ceiling.

BACKGROUND

Drop ceiling systems for building structures are well known in the art with most drop ceiling systems including a plurality of criss-crossing struts defining quadrangular openings in which acoustical panels are releasably supported. Inverted T-shaped support shoulders are hung from the struts and define a quadrangular shelf on which an acoustical panel can be releasably seated. Such ceiling systems in many instances define desired aesthetics or acoustics for the ceiling but they are difficult to install without damaging the ceiling panels and preclude a more contemporary look as is found in some commercial buildings, restored lofts and the like where it is desired that an individual in the building can see through the suspended ceiling into the open space thereabove.

Parallel vanes have been hung from struts provided in the ceiling of building structures but it is difficult to establish a uniform parallel relationship between the vanes and to mount the system in a relatively fast and efficient manner. Further, the vanes sometimes have been mounted so as to be contiguous with the underside of the struts from which they are supported thereby limiting the aesthetics that are available with such mounting systems.

SUMMARY

Examples of the present disclosure provide a new and improved system for suspending vanes from supporting struts within the ceiling of a building structure. In some examples, a ceiling system for building structures includes a plurality of parallel vanes suspended from parallel struts provided in the ceiling of the building structure. In one example, the vanes are connected to the struts with connectors which are slidably connected to a strut by a hanger assembly component of the connector, and then fixably positioned with the connector at a desired location along the length of the strut. A vane is suspended with a suspending assembly on the connector at a spaced location below the struts. The connector includes a vertical pivot rod to which the suspending assembly is connected and rotation of which causes the connector to grip the associated strut at any desired location along the length of the strut. Spacers may be provided in the strut between vanes so that the vanes are connected to a plurality of the struts at desired uniformly spaced locations whereby the vanes extend in parallel uniformly spaced relationship with each other when suspended and when their connectors are locked in position relative to a supporting strut.

The vanes can assume different forms with one such form simply being an aluminum pouch, or a pouch made from another rigid, semi-rigid or flexible material. The vane may be illuminated with an interior lighting system. Other examples include vanes having a base from which any desired material can be connected to hang from the base to provide different aesthetics. Further, in another example, the vane is pivotal about a longitudinal horizontal axis so as to form any of a variety of desired angles relative to the struts from which the vane is suspended.

In a still further example of the disclosure, a plurality of vanes are contiguously connected to a plurality of struts with two-piece connectors which are slidable along a length of a strut to which a vane is to be connected and can be quickly set or releasably anchored in any location along the length of the strut to secure the vane in position. This system is also useful in connecting a pair of vane components which are longitudinally aligned and joined by the connector at the engagement point of the connector to the overlying strut.

In one example, the vanes are spaced downwardly from the struts. In other alternative examples, the vanes can take numerous configurations so that in one example vane panels can be substituted for other vane panels. In another example, a vane can include an illuminating system or the vane can be pivotally mounted so as to extend at different angles from the supporting struts. In a still further example, the vanes can be quickly connected to the struts so as to be contiguous with either a one-piece vane or a two-piece vane where the pieces of a two-piece vane are longitudinally aligned and/or abutted at a suspension location from a strut.

In a further example, a ceiling system for a building structure is provided. The ceiling system includes a plurality of elongated parallel struts suspended within a ceiling of the building structure, a plurality of connectors secured to the struts, and a plurality of elongated vanes connected to the struts by the connectors. The vanes are positioned at a downwardly spaced position from the struts. Each connector secured to a strut may be associated with a separate vane.

Each connector may include a hanger assembly and a suspending assembly. The hanger assembly may be slidably supported on an associated strut and include means for releasably securing the connector to the associated strut at a desired location along the length of the strut. The hanger assembly may include a vertically extending pivotal rod that can be selectively pivoted rotated to releasably secure the connector to an associated strut. Additionally or alternatively, the hanger assembly may include a fastener, such as a threaded rod, that extends through a hole formed in the strut and is secured to the strut. A spacer may be positioned on the pivotal rod to maintain a uniform spacing of the hanger system from the suspending assembly. The suspending assembly may be releasably connected to an associated vane.

The hanger assembly may further include a latch component and a catch component. The latch component may be connected to a pivotal rod for unitary pivotal movement therewith, and the catch component may be operatively connected to an associated strut to remain unitarily positioned relative thereto. When the latch component is pivoted with the rod, the latch component may be releasably fixed in position relative to the catch component to releasably secure the connector to the associated strut. The hanger assembly further may include a resilient biasing system for biasing the latch component into yielding engagement with the catch component. The resilient biasing system may include at least one spring washer mounted on the pivotal rod. The catch component may include an internally-threaded aperture configured to threadably engage a threaded rod.

The plurality of elongated parallel vanes may extend perpendicularly to the plurality of parallel struts. Each vane may be spaced downwardly from a strut to which a hanger assembly is secured. Each vane may be slidably connected to a suspending assembly, which in turn may be connected to a hanger assembly. Each vane may include a light generating system to illuminate the vane. Each vane may include a base connected to an associated connector and a releaseable panel suspended from the base. The panel may be pivotally suspended from the base. For example, the base may include an elongated arcuate support, and the panel may include an arcuate channel pivotally supported by the arcuate support for movement between a plurality of angularly related releasable positions relative to the base.

In yet a further example, another ceiling system for a building structure is provided. The ceiling system includes a plurality of elongated parallel struts suspended within a ceiling of the building structure, a plurality of two piece connectors secured to the struts, and a plurality of elongated vanes connected to the struts by the two piece connectors. Each of the pieces of the connectors may be identical. For example, each piece of the connectors may have mutually perpendicular legs. One of the legs may be releasably connected to an associated strut and the other leg releasably connected to an associated vane. The struts may have elongated upwardly projecting parallel sides, and one leg of each piece may include a downwardly opening channel that receives a side of an associated strut to support the piece on the strut. Each leg of the pieces may include a tightener for releasably connecting the piece to the associated strut and the associated vane. The vane may have two longitudinally aligned components, with each component connected to an associated piece of the connector.

Other advantages and variations will become apparent from the below description and from the appended claims. This summary of the disclosure is given to aid understanding, and one of skill in the art will understand that each of the various aspects and features of the disclosure may advantageously be used separately in some instances, or in combination with other aspects and features of the disclosure in other instances.

BRIEF DESCRIPTION OF THE DRAWINGS

FIG. 16 is an isometric view of a third example of the present disclosure showing illuminated vanes suspended from supporting struts.

FIG. 17 is an enlarged fragmentary section taken along line 17-17 of FIG. 16.

FIG. 18 is a fragmentary isometric of a fourth example of the present disclosure showing a vane suspended from supporting struts.

FIG. 19 is an enlarged fragmentary section taken along line 19-19 of FIG. 18.

FIG. 20 is a fifth example of the present disclosure showing a single vane suspended from a pair of supporting struts.

FIG. 21 is an enlarged section taken along line 21-21 of FIG. 20.

FIG. 22 is an exploded fragmentary isometric view showing the vane used in the example of FIG. 20.

FIG. 23 is an isometric view of a sixth example of the present disclosure showing a tiltable vane suspended from a pair of supporting struts.

FIG. 24 is an end elevation of the system shown in FIG. 23 with the vane shown tilted into various positions in dashed lines and in one disclosed position in solid lines.

DETAILED DESCRIPTION

Figure 1:
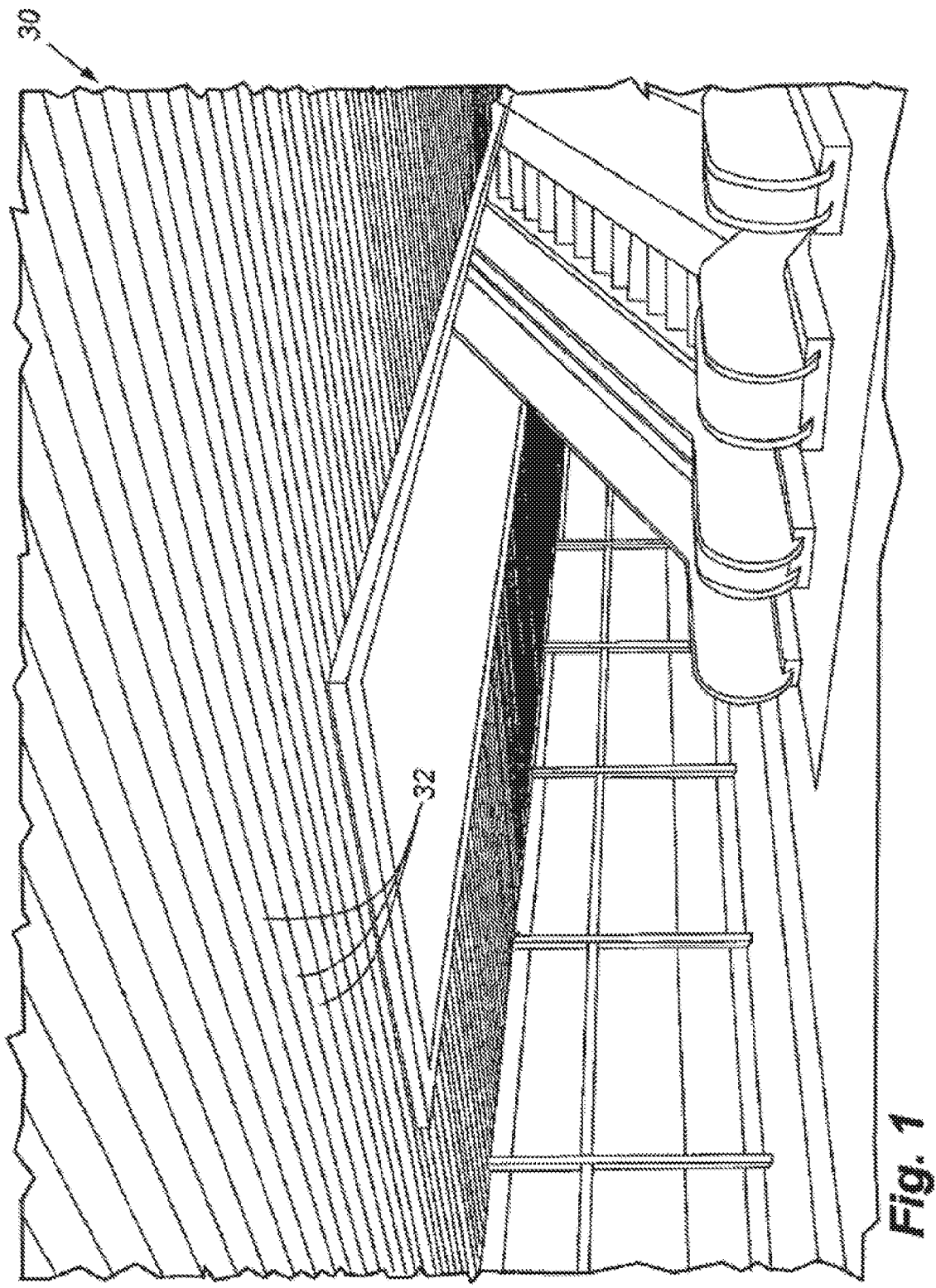
FIG. 1 is an isometric view of a ceiling in accordance with examples of the present disclosure installed in a building structure.
Figure 2:
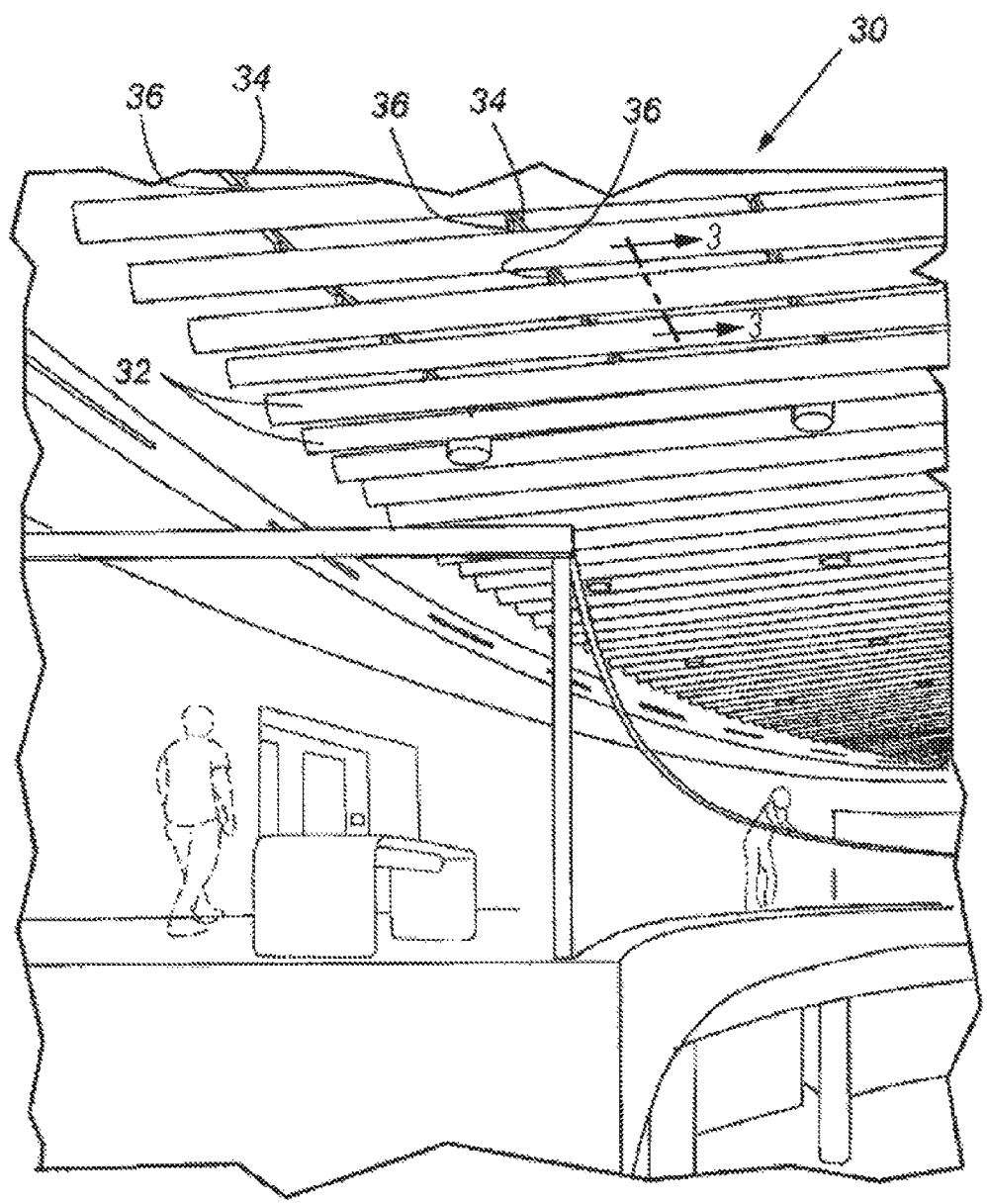
FIG. 2 is an isometric view of a ceiling in accordance with examples of the present disclosure mounted in a building structure illustrating a different angle and view of the ceiling from that of FIG. 1.

Referring first to FIGS. 1 and 2, a ceiling system 30 in accordance with the present disclosure is shown in two different environments with the environment shown in FIG. 1 illustrating the ceiling system at an angle so that only the vanes 32 are seen and not an open ceiling structure above the vanes. In FIG. 2, the ceiling system 30 is shown in an environment and at a different angle so that it is evident an individual can look between the vanes 32 of the ceiling system into an open space above the vanes. A plurality of parallel struts 34 are provided above the vanes, with which connectors 36 are used to suspend the vanes from the struts.

Figure 3:
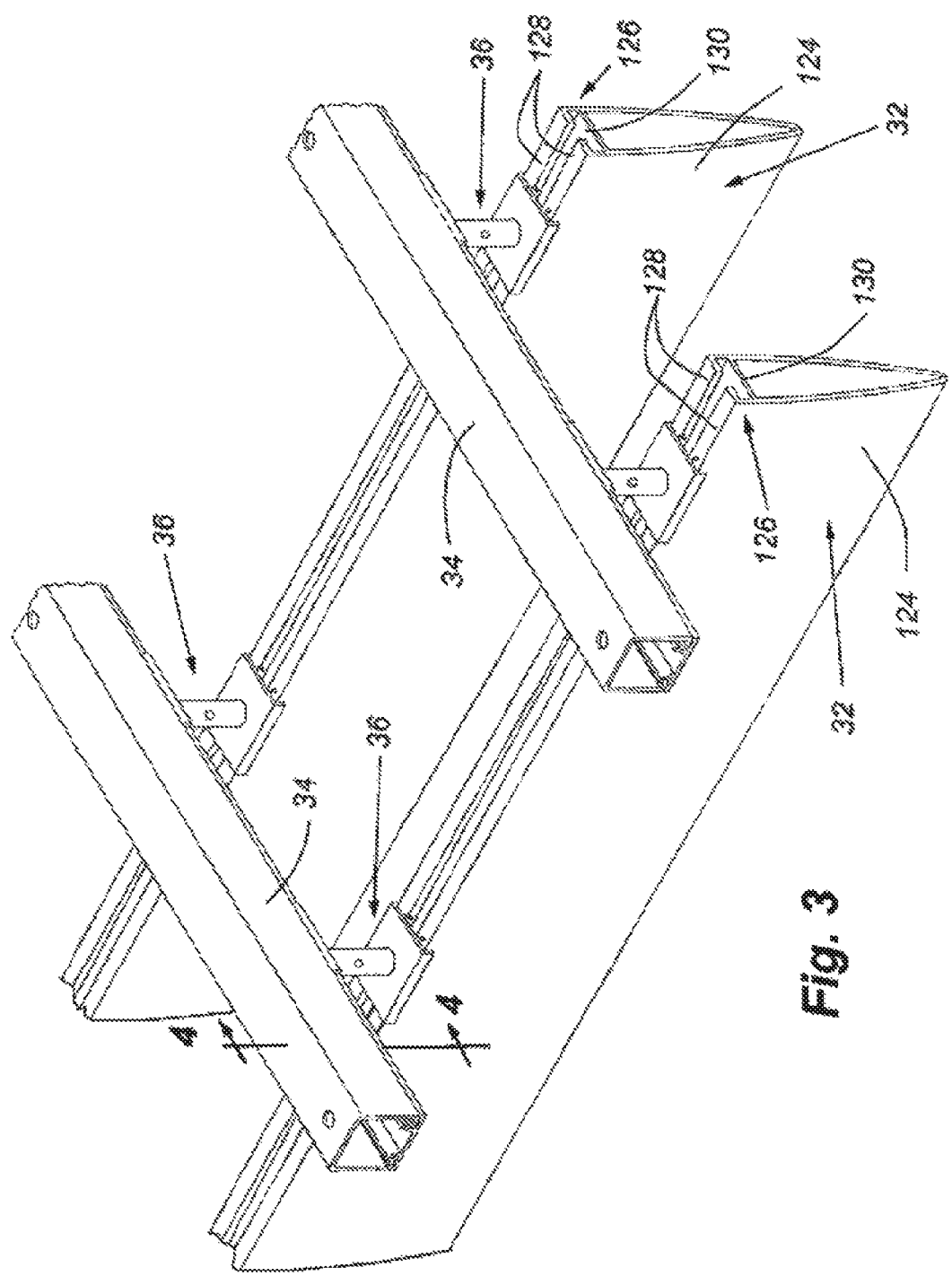
FIG. 3 is an enlarged fragmentary section taken along line 3-3 of FIG. 2.

FIG. 3 illustrates a pair of parallel vanes 32 suspended from a pair of parallel struts 34 in a perpendicular relationship with it being understood in a complete ceiling system, there would normally be many parallel struts along with many parallel vanes suspended therefrom in perpendicular relationship to the struts. The struts in turn would be suspended from the structure of the building, as from support beams (not shown) which are directly connected to the struts or from which the struts are supported by suspension rods, cables or the like (which are not shown). In FIG. 3, the vanes 32 are oriented vertically for clarity.

Figure 4:
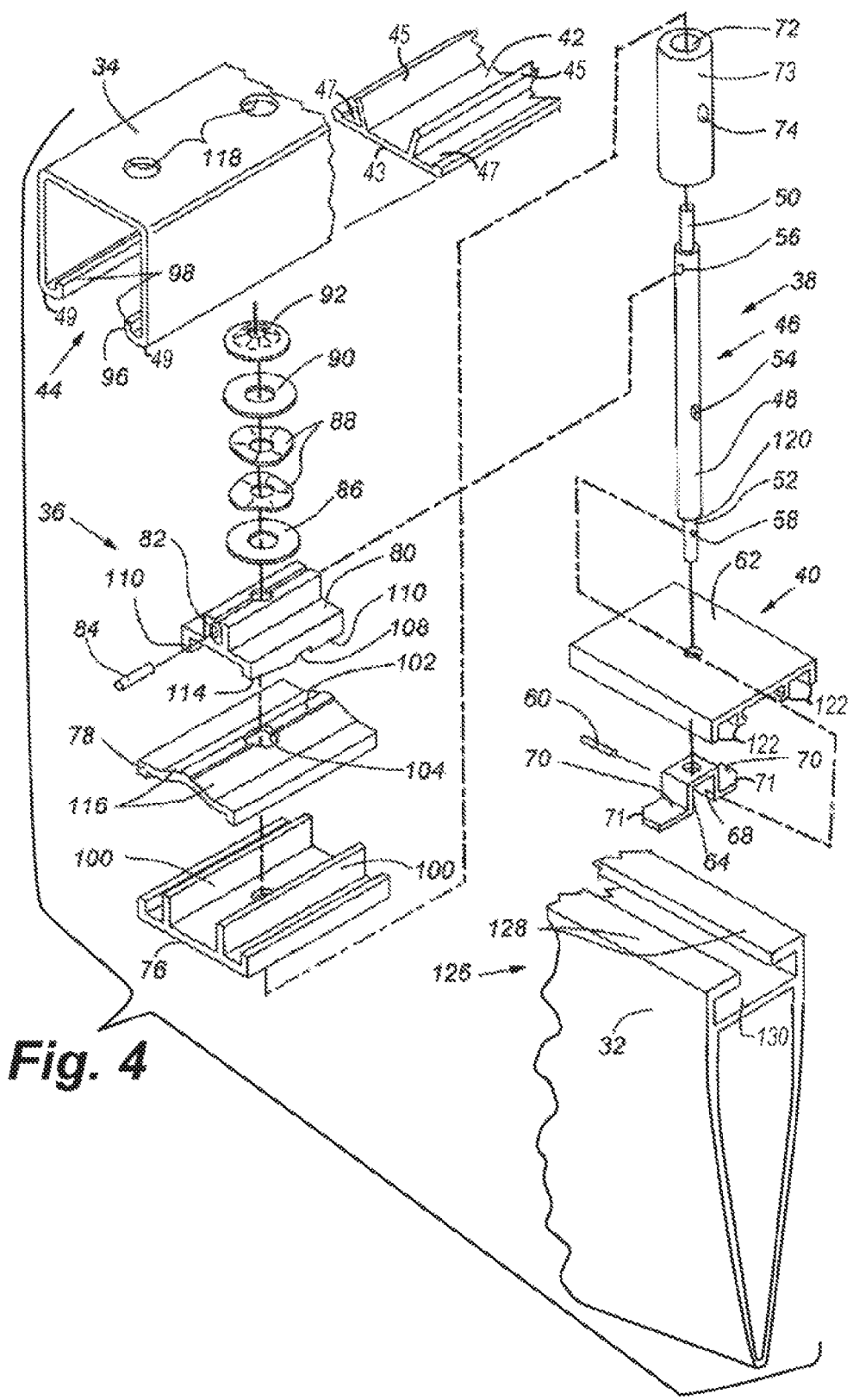
FIG. 4 is an exploded isometric view of a connector and its relationship to a supporting strut.
Figure 5:
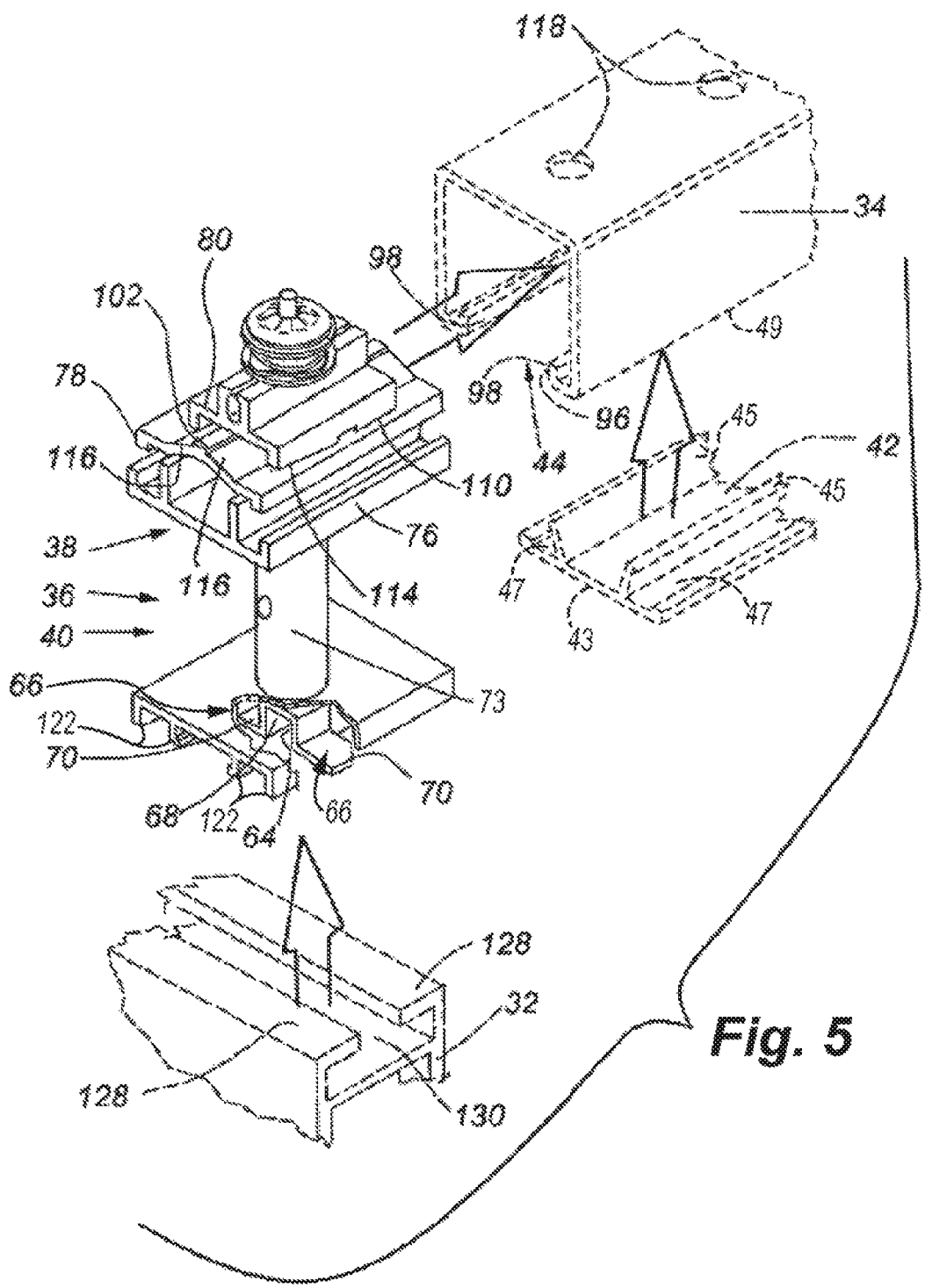
FIG. 5 is an isometric view of a connector shown in relationship with a strut, spacer, and vane shown in dash lines.

In general, and as possibly best appreciated by reference to FIGS. 4 and 5, the vanes 32 are suspended from the struts 34 by the connectors 36, each of which includes a hanger assembly 38 and a suspending assembly 40. The hanger and suspending assemblies are interconnected in a manner to be described hereafter with the hanger assembly 38 being at the top of the connector 36, and the suspending assembly 40 being at the bottom of the connector 36. The hanger assembly 38 is designed to cooperate with the struts 34 in a manner such that the connector 36 can be slid along the length of an associated strut 34 and then releasably locked in a desired position. The vanes can thus be mounted in parallel relationship with each other. The suspending assembly 40 is designed to slidably receive the top of a vane 32.

Continuing in general with reference to FIGS. 4 and 5, a spacer 42 of any of a variety of predetermined lengths, which defines the spacing desired between vanes, is also slidably positioned within an associated strut 34. Each spacer 42 is inserted into the strut 34 so as to extend between adjacent connectors 36 to obtain the desired uniform spacing between connectors 36 (and thus the corresponding vanes 32) associated with any individual strut 34. The example spacer 42 includes a base 43, which may be substantially flat, and a pair of ribs 45 extending upward from the base 43 in a divergent relationship to one another. The spacer 42 is designed so that when inserted into a strut 34, a top surface 47 of the base 43 is positioned adjacent to and beneath a lower surface 49 of the strut 34 to substantially cover a downwardly opening channel 44 of the strut 34. The ribs 45 extend above the upturned lips 98 of the strut 34 to trap or capture the lips 98 of the strut 34 between the ribs 45 and the base 43 of the spacer 42, thereby slidably coupling the spacer 42 to the strut 34. Thus, in some implementations, the assembled connectors 36 and spacers 42 substantially close the bottom opening of the strut 34 to provide a suspension ceiling with improved aesthetics when viewed from below.

As will be explained hereafter, the hanger assembly 38 of each connector 36 is designed to be slidably inserted into a downwardly opening channel 44 of the strut 34 until it is desirably positioned in abutment with a spacer 42. The connector 36 is quickly and easily releasably locked or fixed into position in a manner and with a structure described hereafter so as to retain that position relative to the strut.

The component parts of the connector 36, including the hanger assembly 38 and the suspending assembly 40, are illustrated in FIG. 4, where it can be seen a central pivot rod 46 is provided having a relatively large diameter main body 48 with reduced diameter upper 50 and lower 52 axial extensions from opposite ends. A first transverse passage 54 is provided through the main body at an approximate central location and a second transverse passage 56 is provided through the main body adjacent the top thereof. A third transverse passage 58 is provided through the lower reduced diameter axial extension 52 of the pivot rod with this passage being perpendicular to the second passage 56. The central pivot rod 46 is a central framework about which the hanger assembly 38 and the suspending assembly 40 are related.

Figure 7:
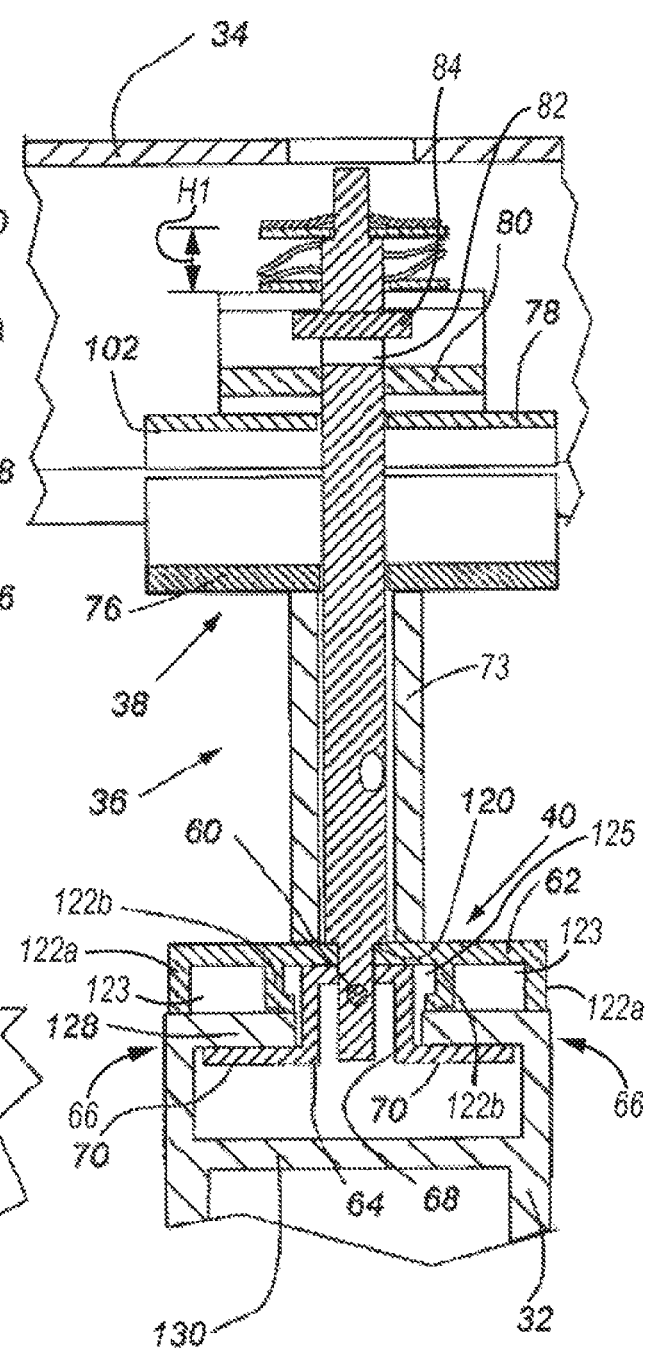
FIG. 7 is a fragmentary section taken along line 5-5 of FIG. 6.

The suspending assembly 40 as shown in FIGS. 4, 5, and 7 is suspended from the lower end of the pivot rod 46 by a first cross pin 60. The suspending assembly 40 includes an upper plate 62 and a lower body 64. The upper plate 62 includes a plurality of downwardly directed ribs 122 that define channels therebetween. In particular, the upper plate 62 includes a pair of outer ribs 122a and a pair of inner ribs 122b, with each inner rib 122b including a laterally extending shoulder. Lateral channels 123 are formed between the outer and inner ribs 122a, 122b, and a central channel 125 is formed between the inner ribs 122b. The central channel 125 is sized to receive an upper portion of the lower body 64 so that when assembled the lower body 64 abuts the upper plate 62 and the lower body 64 can pivot 360° within the channel 125.

The lower body 64 of the suspending assembly 40 has a downwardly opening longitudinal channel 68 formed therein with laterally extending flanges 70. When assembled, the flanges 70 are vertically spaced apart from the ribs 122 of the upper plate 62 to define a passage 66 therebetween into which the inturned flanges 128 of the upper base 126 of a vane 32 can be slid. Thus, the vane 32 can be slidably suspended from a strut 34. To engage or disengage the vane 32 from the suspending assembly 40, the lower body 64 is rotatable between the inturned flanges 128 so that the lower body 64 of each connector 36 can be selectively rotated to engage or disengage the flanges 70 with the upper base 126 of a vane 32. In addition, each flange 70 includes a chamfered corner 71 to permit the lower body 64 to pivot 90° within an upper base 126 of a vane 32, and particularly within the space defined vertically between the inturned flanges 128 and the horizontal wall 130 of the upper base 126. To retain the suspending assembly 40 to the pivot rod 46, the channel 68 of the lower body 64 provides a passage into which the first cross pin 60 can be inserted so as to be received in the third transverse passage 58 through the lower end of the pivot rod 46. The pin 60 is of a length such that the pin 60 can pivot 360° within the channel 68 so that the lower body 64 can be rotated independently of the pivot rod 46. Thus, the suspending assembly 40 can engage the vane 32 independently of the hanger assembly 38 engaging the strut 34. The first cross pin 60 thereby supports the suspending assembly 40 from the lower end of the pivotal rod 46 as will be further appreciated with the description that follows but the suspending assembly 40 is independently pivotal through a 90° arc relative to the hanger assembly 38.

Again referring to FIG. 4, the hanger assembly 38 can be seen to include a spacer sleeve or cylinder 73 having an internal passage 72 slightly greater than the diameter of the main body 48 of the pivot rod 46 so that the sleeve 73 can be slid downwardly over the main body 48 of the pivot rod 46 and rest upon the top surface of the upper plate 62 of the suspending assembly 40. When the sleeve 73 is desirably positioned upon the pivot rod 46, a transverse passage 74 through the spacer sleeve 73 is aligned with the first transverse passage 54 through the pivot rod 46. Resting on top of the spacer sleeve 73 and also forming part of the hanger assembly 38 is a bottom plate 76, an intermediate plate 78 above the bottom plate 76, and above that a top plate 80 with the top plate 80 being referred to as a latch component of the hanger assembly 38. The intermediate plate 78 is a selectively movable component of the hanger assembly 38 and is referred to as a catch component of the hanger assembly 38. The top plate or latch component 80 has a longitudinal channel 82 having an elongated vertical dimension for receipt of a second cross pin 84. The channel 82 defines a slot along its top which creates an opening through the top of the latch component 80. The channel 82 may be aligned with the upper second passage 56 through the pivot rod 46 when assembled so that when the latch component is desirably positioned on the pivot rod 46 in the desired vertical location. The second cross pin 84 can be inserted through the channel 82 in the latch component 80 and through the second passage 56 in the pivot rod 46 to retain the latch component 80 on the pivot rod 46 with the intermediate plate 78 and the bottom plate 76 therebeneath. It will be appreciated that the second cross pin 84 serves to key the latch component 80 to the pivot rod 46 so that they may pivot in unison about the longitudinal axis of the pivot rod 46.

Referring still to FIGS. 4 through 7, above the latch component 80, a lower washer 86 is provided in axial alignment with the pivot rod 46 and adapted to be received on the reduced diameter upper extension 50 of the pivot rod 46. The lower washer 86 rests on the shoulder formed between the middle portion 48 and the upper portion 50. A pair of spring washers 88 are disposed on the lower washer 86. Above the spring washers an upper washer 90 is positioned. Above the upper washer 90 a lock washer 92 is positioned. The lock washer 92 fits on the reduced diameter upper extension 50 of the pivot rod 46 to hold the washers all in position on the upper reduced diameter extension 50 of the pivot rod 46. As described in more detail below, by applying suitable downward pressure to the spring washers 86 with the lock washer 92, the spring washers 86 can be maintained in a biased condition so as to apply a downward biasing force on the latch component 80 of the hanger assembly 38 so that the latch component 80 applies a yielding downward force against the intermediate plate or the catch component 78 of the hanger assembly 38. This helps selectively secure the hanger assembly 38 to the strut 34 for desired vane positioning.

With continuing reference to the hanger assembly 38 and to FIGS. 4 through 9, the bottom plate 76 is slightly wider than the catch component 78 and the latch component 80. The bottom plate 76 is sized to be at least partially slidably inserted into the downwardly opening channel 44 of an associated strut 34. The associated strut 34 defines a downwardly opening slot 96 (shown in FIGS. 6 and 8) with upturned lips 98 along opposite sides of the strut 34 so that the bottom plate 76 is slidably supported on the upturned lips 98.

Figure 12:
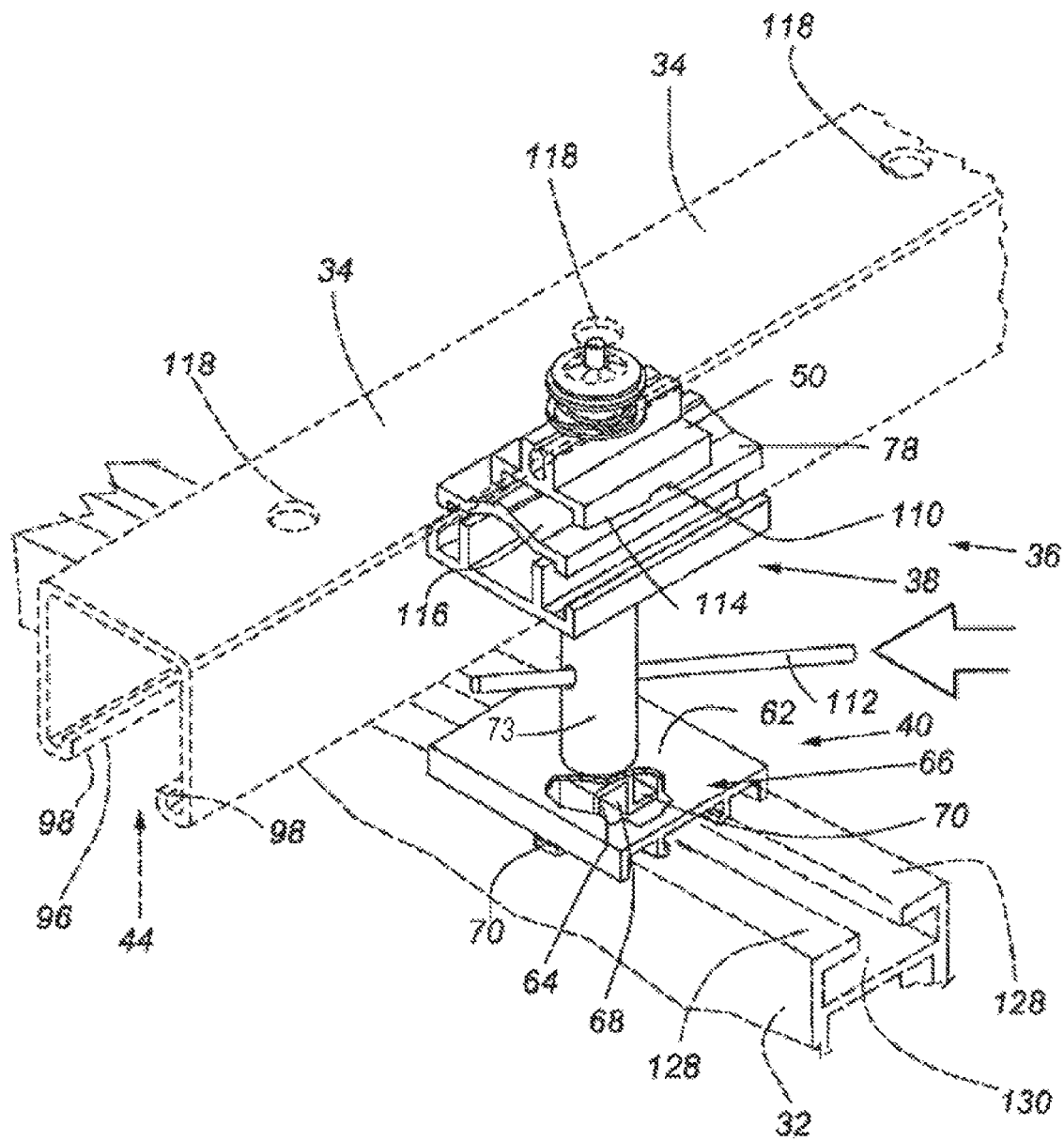
FIG. 12 is an isometric view showing a connector positioned within a strut and supporting a vane with the strut and vane shown in dashed lines.

FIGS. 5 and 12 show the connector 36 fully assembled, with FIG. 5 showing the connector 36 aligned for insertion of the hanger assembly 38 into the open end of an associated strut 34, and for receipt of the upper end 126 of a vane 32 on the suspension assembly 40. The spacers 42 are inserted into the strut 34 after each insertion of a connector 36 so as to obtain a desired uniform spacing between connectors 36 and thus the respective vanes 32 along the length of an associated strut 34.

Figure 6:
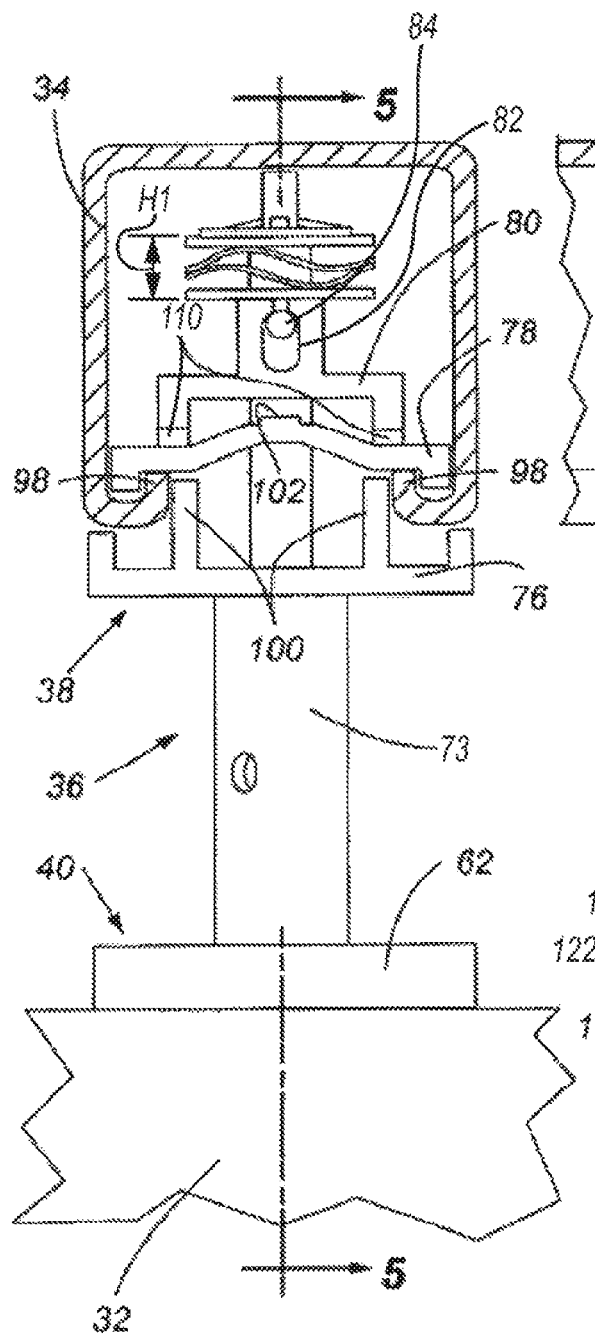
FIG. 6 is a further enlarged fragmentary section taken along line 4-4 of FIG. 3.

FIGS. 6 through 10 show the connector 36 in various mounted relationships with a strut 34 and a suspended vane 32. Referring first to FIG. 6, the hanger assembly 38 is shown with the bottom plate 76 disposed beneath the associated strut 34. and the bottom plate 76 defines a pair of upstanding longitudinally extending ribs 100 projecting upwardly from the bottom plate 76, and each being spaced apart equally on either side of the centerline of the bottom plate 76. When assembled, the ribs 100 are received into the open bottom of the strut 34, adjacent to the upturned lips 98. The bottom plate 76 is received onto the main portion of the pivot rod 46 through aperture 104, and rests in the desired vertical location on the top end of the spacer 73.

Still referring to the hanger assembly 38, overlying the bottom plate 76 is the intermediate plate or catch component 78, which can be seen in FIGS. 4 through 6 and 12 to have a longitudinally extending central rectilinear rib 102 formed along its longitudinal center and extending upwardly from its top surface. Along that rib 102 as seen in FIG. 4 for example, a relatively large opening 104 is provided to receive the main body 48 of the pivot rod 46. Notches 108 are provided on opposite lower longitudinal edges 110 of the overlying latch component 80 so that when the notches 108 are selectively aligned with the rib 102 on the catch component 78, the latch component 80 is yieldingly retained in transverse relationship to the catch component 78. This alignment is releasable, as described below, and allows a user (such as the installer) to hold the hanger assembly 38 in a selected position along the length of the strut 34.

When initially assembled, the latch component 80 and the catch component 78 are longitudinally aligned as seen in FIGS. 4 through 6 and 12 through 13. As defined in more detail below, the overlying latch component 80 may be pivoted 90° by rotation of the pivot rod 46 since the latch component 80 and pivot rod 46 rotate in unison as mentioned previously. The rotation of the latch component 80 selectively secures the hanger assembly 38 in place on the strut 34. The pivot rod 46 can be pivoted with a tool 112 in the form of a cylindrical rod that is inserted through the central first transverse passage 54 through the pivot rod 46 as shown for example in FIGS. 8 and 9.

The assembly and engagement of the connector 36 to the strut 34 and the vane 32 will now be generally described. FIG. 4 shows the connector 36 prior to assembly in exploded view, with the hanger assembly 38 and the suspension assembly 40 oriented for engagement with the strut 34 and the vane 32, respectively.

FIG. 5 shows the hanger assembly 38 in assembled fashion with the lower plate 76, the catch plate 78, and the latch plate 80 all oriented in lengthwise alignment for insertion into the cavity of the strut 34 and engagement with the slot 44. In this position, the latch plate 80 is in position to be actuated by rotation to secure the connector 36 to the strut 34. The suspension assembly 40 is also shown with the lower body 64 oriented such that the flanges 70 can be received into the slot formed by the spaced apart flanges 128 and the horizontal wall 130. In this position, the lower body 64 is in position to be actuated by rotation to secure the vane 32 onto the connector 36. The lower body 64 also may be inserted into the end of the vane 32 with the flanges 70 extending transversely to the length of the vane 32.

FIGS. 6 and 7 show the connector 36 after the hanger assembly 38 has been inserted into the strut 34, and the suspension assembly 40 has received the upper base 126 of the vane 32. Here, the vane 32 is secured onto the suspension assembly 40, but the suspension assembly 40 is movable along the length of the vane 32. The hanger assembly 38 is movably secured within the strut 34 such that the connector 36 and the vane 32 will not disengage from the strut 32 and fall to the ground, yet the hanger assembly 38, and thus the vane 32, are moveable along the length of the strut 34. As illustrated in FIGS. 6 and 7, the washer assembly has non-actuated height H1.

Figures 8, 9:
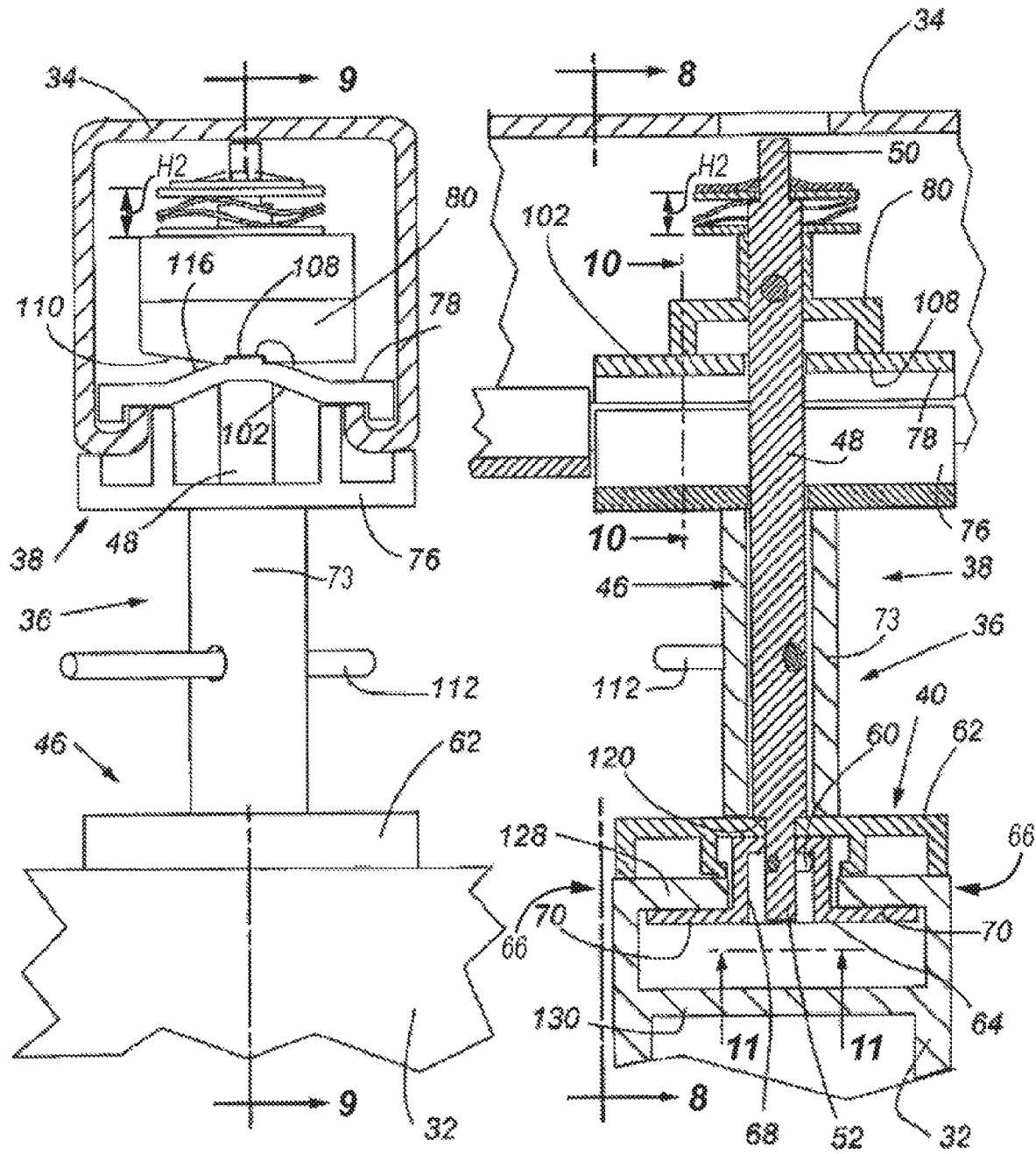
FIG. 8 is a fragmentary section taken along line 8-8 of FIG. 9.
FIG. 9 is a fragmentary section taken along line 9-9 of FIG. 8.
Figure 10:
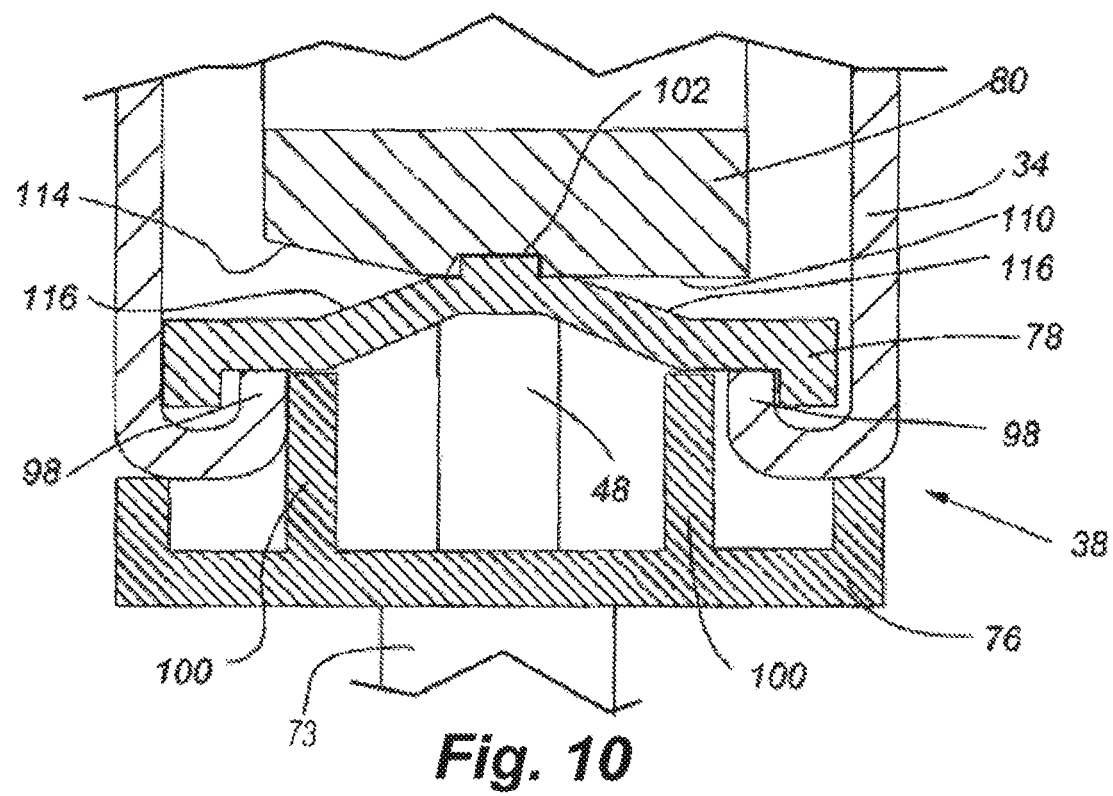
FIG. 10 is a further enlarged fragmentary section taken along line 10-10 of FIG. 9.

FIGS. 8 and 9 show the connector 36 after the hanger assembly 38 has been actuated by rotation of the pivot rod 46. As mentioned above, rotation of the pivot rod 46 orients the latch component 80 such that its slot 108 engages the rail 102 to releasably secure, by actuating the spring assembly on the pivot rod 46, the hanger assembly 38 in place along the length of the strut 34.

In more detail relating to the releasable engagement of the hanger assembly 38 to the strut 34, and with continued reference to FIGS. 6 through 13, when the pivot tool 112 pivots the pivot rod 46 through 900, the latch component 80 pivots about the longitudinal axis of the pivot rod 46 so that beveled surfaces 114 along opposite ends and opposite side edges of the latch component 80 will ride up cam surfaces 116 on the top surface of the catch component 78 on both sides of the central rib 102. This cam engagement forces the latch component 80 to move upwardly against the bias of the spring washers 88 until the latch component 80 is rotated enough so that the rib 102 snaps into the notches 108 in the latch component 80. At this point, the latch component 80 is forced downwardly by the spring washers 88 until the rib 102 and notches 108 are seated. In this engagement, the latch 80 is yieldingly but releasably interconnected and the latch component 80 is releasably positioned relative to the catch component 78. As illustrated in FIGS. 8 and 9, the washer assembly has an actuated height H2, which is less than the non-actuated height H1 of the washer assembly shown in FIGS. 6 and 7 since the washer assembly has been compressed by the movement of the latch component 80 up the cam surface 116 of the catch component 78.

FIG. 7 correlates with FIG. 6 showing the latch component 80 and catch component 78 prior to engagement and longitudinally aligned in an unlocked relationship. Once the latch component 80 has been rotated to releasably lock the latch component 80 to the catch component 78 under the bias of the spring washers 88, the entire assembly is compressed downwardly against the upturned lips 98 of the associated strut 34 so that the connector 36 is frictionally held in position on the strut 34. This engagement is releasable inasmuch as the latch component 80 can again be rotated in an opposite 90° turn against the bias of the spring washers 88, which bear against the upper washer 90 and lock washer 92 to create the spring force, to rotate the latch component 80 and disengage the rib 102 from the slot 108 and thus disengage the spring force. When the locking engagement is released, the frictional pressure on the strut is also released so that the connector 36 can be slid longitudinally of the strut 34 if desired for repairs or the like.

While the strut 34 has been illustrated with holes 118 through a top wall thereof, the holes 118 are merely provided at fixed intervals along the length of the strut 34 so that it can be connected to overlying support beams (not shown) in any conventional manner. The holes 118 in the top wall of the struts 34 do not have an operative relationship to the connectors 36 which are suspended from the strut 34. The holes 118 may be formed in various shapes, such as circular or an elongated slot as known in the art.

Again referring to FIGS. 6 through 9, the suspending assembly 40 is seen including the upper or top plate 62 and the lower body 64 which define a gap or passage 66 therebetween. The top end of a vane 32 is slid and slidably supported by the lower body 64 being positioned therein. As mentioned previously, the suspending assembly 40 is connected to the lower end of the pivot rod 46 with the first cross pin 60 which is passed through the lower second passage 56 in the pivot rod 46 to hold the upper plate 64 and lower body 62 of the suspending assembly 40 against a circumferential shoulder 120 between the main body 48 and lower reduced diameter extension 52 of the pivot rod 46 as best seen for example in FIGS. 7 and 9. When the upper end of a vane 32 is suspended from the suspending assembly 40, the flanges 70 extending along opposite sides of the lower body 64 provide a support for the vane 32, while downwardly directed ribs 122 in the upper or top plate 62 overlie the vane to slidably confine the vane 32 to the suspending assembly 40.

The vanes 32 can assume different forms and perform different functions but the vane 32 illustrated in the first example above, as possibly best seen in FIG. 3, includes a generally V-shaped pouch 124. In this example, the vane 32 may be made of aluminum or another suitable material that might be rigid, semi-rigid or even flexible with the upper end of the vane 32 defining an upper base 126 operably associated with the pouch. The upper base 126 is sufficiently rigid, and defines inturned but longitudinally spaced extending flanges 128 which overlie in spaced relationship a horizontal wall 130. The space between the inturned flanges 128 and the horizontal wall 130 slidably receives the flanges 70 of the lower body 64 of the suspending assembly 40 as seen in FIGS. 7 and 9.

Figure 11:
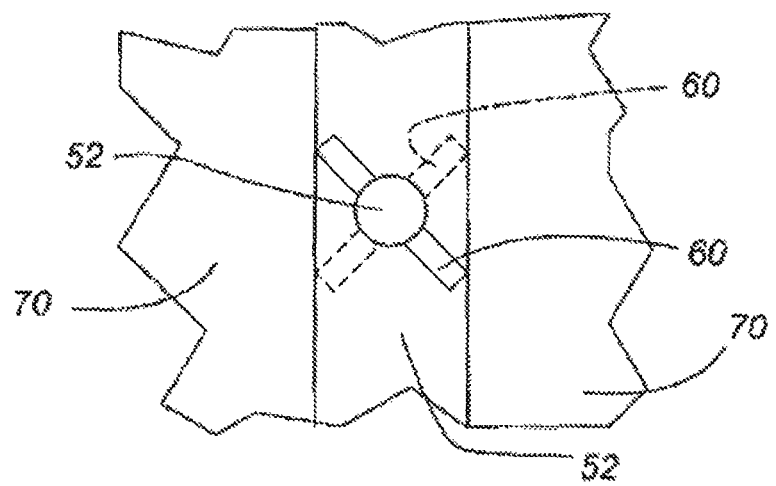
FIG. 11 is a further enlarged fragmentary section taken along line 11-11 of FIG. 9.
Figure 13:
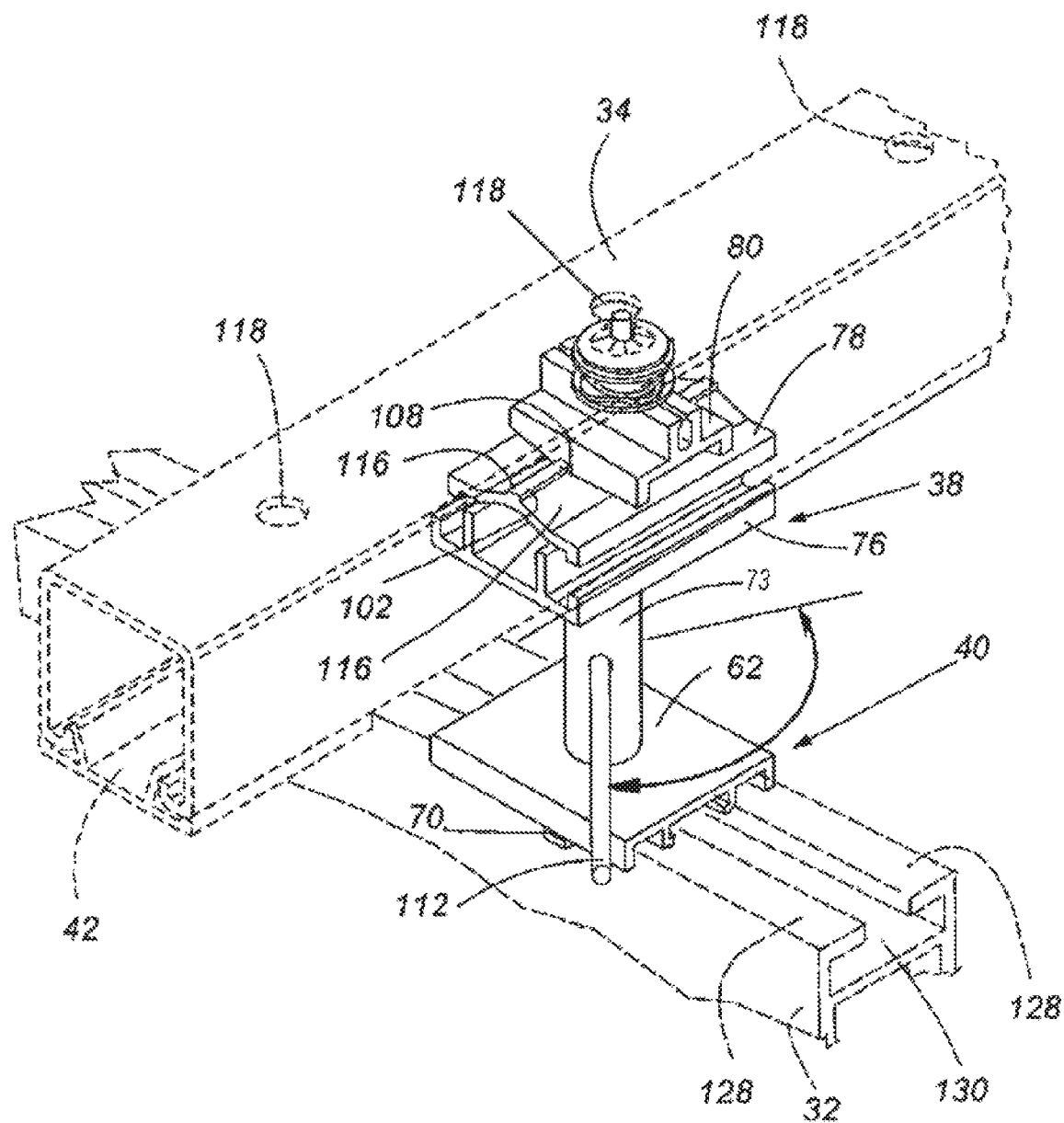
FIG. 13 is an isometric view similar to FIG. 12 with the connector fixably secured to the strut and showing a rotation of the connector for releasably securing it in position.

FIGS. 12 and 13 are operational views with FIG. 12 showing the connector 36 with a vane 32 slidably suspended from the suspending assembly 40 and the hanger assembly 38 having been inserted into an associated strut 34. In FIG. 12, the latch component 80 and the catch component 78 are longitudinally aligned so the connector 36 can be slid easily along the length of the strut 34 until it, for example, engages a spacer 42 that was inserted previously to desirably position the connector 36 before releasably locking the connector 36 in place (as shown in FIG. 13). The cylindrical tool 112 is used to releasably lock the connector 36 in place by inserting the connector 36 through the first transverse passage 54 of the pivot rod 46 and rotating it 90° so as to rotate in unison therewith the latch component 80 until the notches 108 on the lower edge of the latch component 80. Once rotated to be transverse with strut the extension (about 90° in this example), the latch component 80 snaps onto the rib 102 on the catch component 78 as possibly seen best in FIG. 10. It should be noted, however, that during the 900 pivotal movement of the pivot rod 46 and the latch component 80, the lower cross pin 60 connecting the pivot rod 46 to the suspending assembly 40 also pivots through the same 90° but as seen in FIG. 11 and mentioned earlier, the pin 60 is of a length such that it can pivot within the downwardly opening channel 68 of the lower body 64 of the suspending assembly 40 without moving the suspending assembly 40. The pin 60 does not thereby inhibit the desired 90° pivotal movement required for releasably securing the connector 36 in place within the strut 34.

To summarize the actuation of the hanger assembly 38 in the strut 34 and the vane 32 to the suspension assembly 40, when connecting the connector 36 to a strut 34 and vane 32, the hanger assembly 38 is first inserted into the strut 34 as illustrated for example in FIG. 5. Once the hanger assembly 38 is within the strut 34, it is suspended from the strut 34 but is not locked in position until the latch component 80 is pivoted 90° relative to the catch component 78. With the hanger assembly 38 merely supported within the strut 34, the upper plate 62 and lower body 64 of the suspending assembly 40 (which pivot in unison) are rotated 90° from the position illustrated in FIG. 4 so that the flanges 70 on the lower body 64 are aligned with the space between the inturned flanges 128 of the vane. The 90° pivotal movement of the upper plate 62 and the lower body 64 is facilitated due to the fact that the pin 60 supporting the suspending assembly 40 permits the 90° pivotal movement as illustrated and discussed previously in connection with FIG. 11. Once the vane 32 has been elevated as shown in FIG. 5 so that the lower body 64 is within the top of the vane 32, the upper plate 62 and lower body 64 are rotated 90° in a reverse direction so that the flanges 70 on the lower body 64 underlie the flanges 128 on the vane 32 whereby the vane 32 is supported by the suspending assembly 40. Once the vane 32 has been suspended from the suspending assembly 40, the tool 112 can be inserted into the hole 54 through the pivot rod 46 so that the rod 46 can be pivoted 90° to rotate the latch plate 80 of the hanger assembly 38 relative to the catch plate 78 until the latch plate 80 is yieldingly but releasably locked in a perpendicular relationship to the catch plate 78 to releasably fix the position of the connector 36 within the strut 34. This movement is permitted without disturbing the connection of the vane 32 to the suspending assembly 40 because the pivotal movement of the pivot rod 46 can be made without moving the suspending assembly 40 and the suspending assembly 40 will not permit the vane 32 to pivot. Pursuant to the above, it can be seen that the vane 32 can be easily connected to associated suspending assemblies 40 and the associated connector 36 fixed in position with the hanger assembly 38 along the length of a strut 34.

Figure 14:
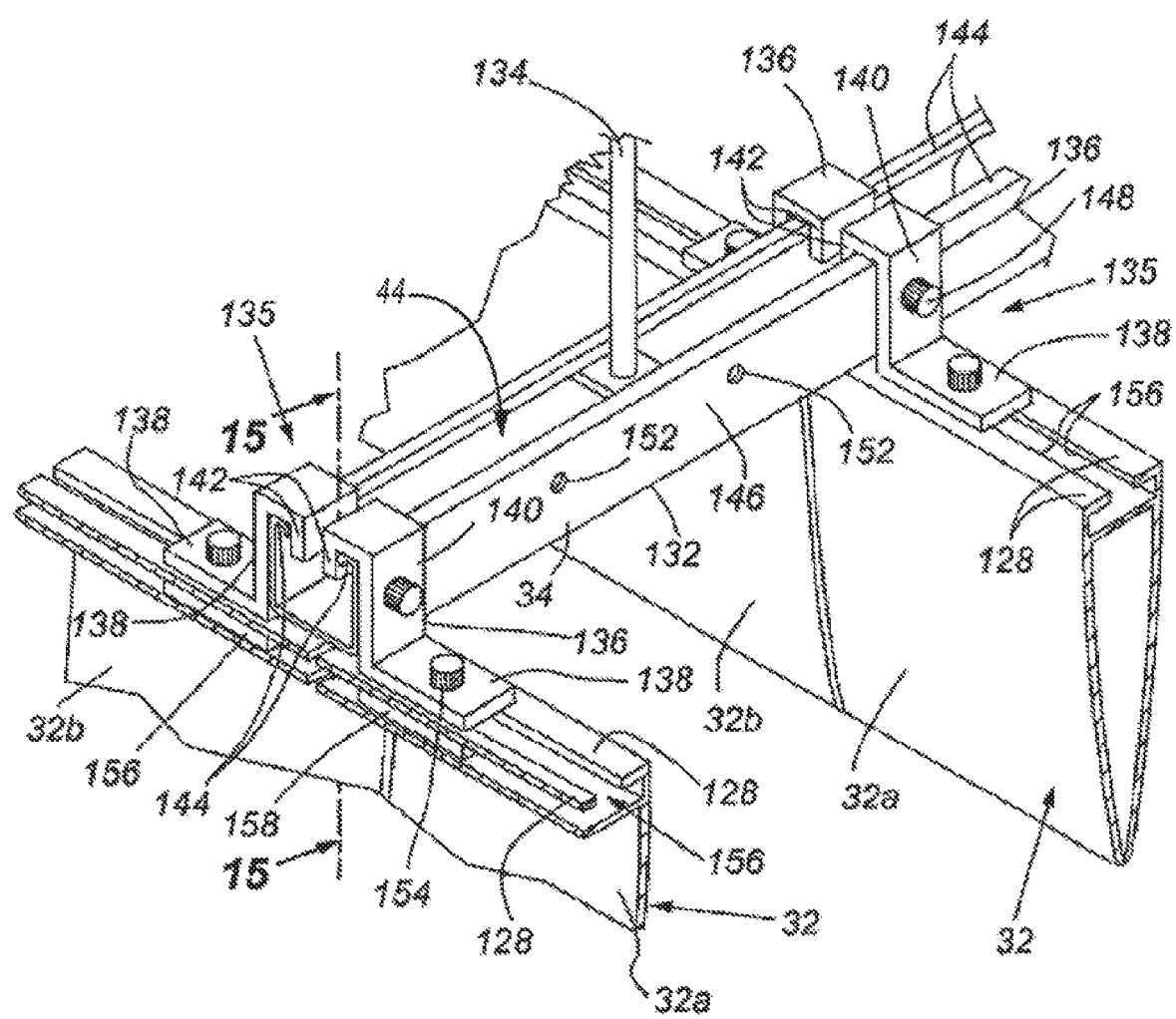
FIG. 14 is an isometric view of a second example of the present disclosure showing connectors supporting a pair of adjacent vanes from a strut.
Figure 15:
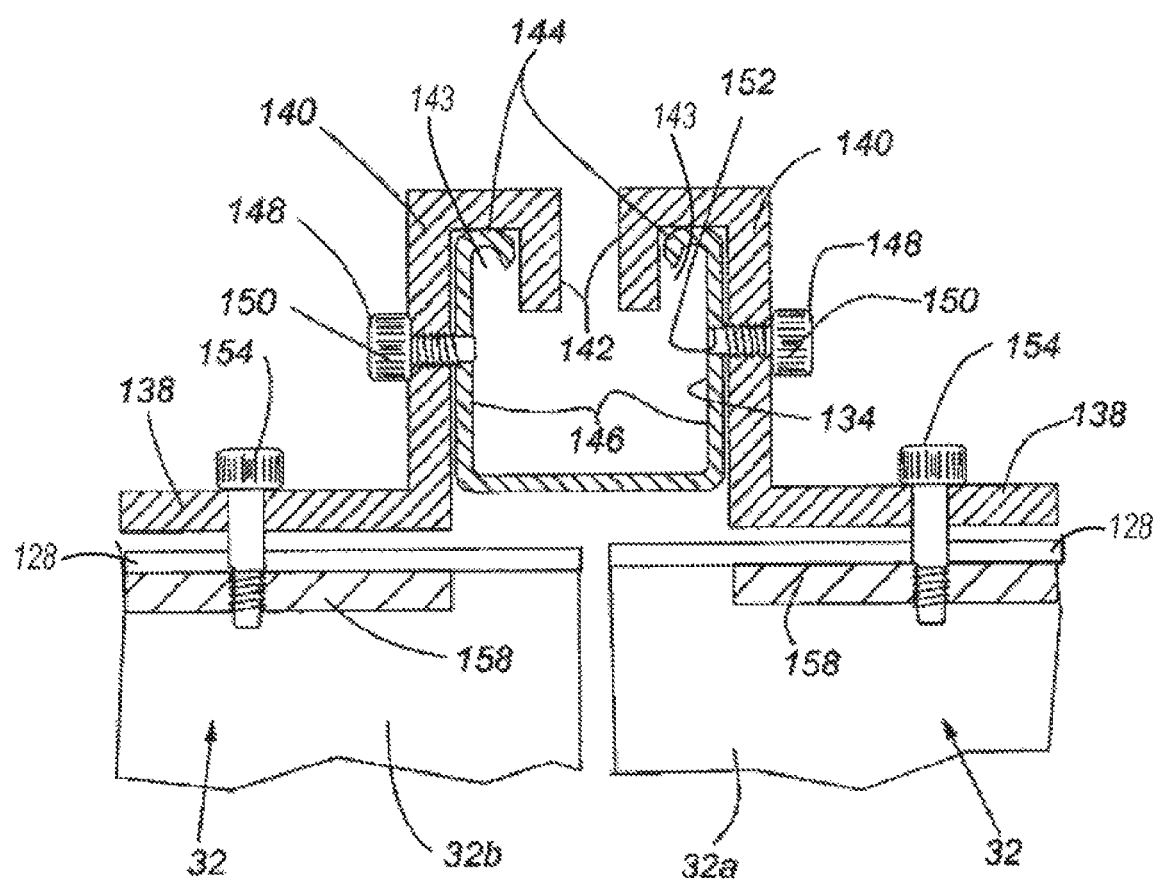
FIG. 15 is an enlarged fragmentary section taken along line 15-15 of FIG. 14.

A second example of the present disclosure is shown in FIGS. 14 and 15. In this example, vanes 32 of the same form illustrated in the first example are suspended from struts 34 in close relationship with the bottom edge 132 of the struts. The vanes 32 may be suspended contiguously as will be evident to those skilled in the art. As seen in FIG. 14, a vertical rod 134 supports the strut 34 from an overlying support beam (which is not shown) and suspends the various parallel struts 34 used in the system in a uniform horizontal plane. The strut 34 in the second example is identical to the strut 34 in the first example, but the strut 34 in the second example has been inverted so the channel 44 opens upwardly. The connectors 135 in the second example are seen to be two-piece connectors, with each piece 136 being identical in configuration. Each piece 136 of the connector 135 includes a horizontal leg 138 and a vertical leg 140. The top edge of the vertical leg 140 has an inverted lip 142 that defines a downwardly opening channel 143 sized to receive the upper edges 144 of the strut 34. The vertical leg 140 of each piece 136 of the connector 135 is connected to a side wall 146 of the strut 34 with a thumb operated fastener or tightener 148 having a knurled head 150. The fastener 148 is adapted to extend into passages 152 formed in the side walls 146 of the strut 34. The passages 152 may be uniformly spaced along the length of the strut 34. The lower or horizontal leg 138 of each piece 136 of the connector 135 overlies the top of a vane 32 to be connected to a strut 34. The horizontal leg 138 of each piece 136 of the connector 135 is connected to a top of a vane 32 with a thumb operated threaded fastener or tightener 154. The fastener 154 extends through a gap 156 formed between the flanges 128 of the top edge of the vane 32, and the fastener 154 is threadably received in an anchor plate 158 positioned within a channel formed in the top edge of the vane 32. Rotating the knurled fastener 154 clamps the vane 32 between the anchor plate 158 and the horizontal leg 138 of the connector 135, thereby firmly suspending and anchoring the vane 32 to the strut 34 at a predetermined position along the length of the strut 34.

While the two-piece connector 135 illustrated in FIGS. 14 and 15 can be used to attach a continuous, one-piece vane to an overlying strut 34, the connector 135 can also be used to connect a two-piece vane to the overlying strut 34. For example, as shown in FIGS. 14 and 15, each piece 136 of the connector 135 may be connected to an end of one of the vane pieces 32a or b so the vane pieces are positioned either closely to each other or contiguously with each other in longitudinal alignment. Two-piece vanes may be utilized when the length of a continuous vane 32 is so long that is desirable to have the vane 32 separated into smaller lengths rather than one single, long length.

Referring to FIGS. 16 and 17, a third example of the present disclosure is shown. In this example, the connector 36 may be identical to that of the first example. However, as shown in FIGS. 16 and 17, the vane is different. The vane 160 has two parallel sides 166 and a vertical divider 168 positioned centrally between the sides 166. A lower end of the divider 168 bisects an arcuate wall 169 extending between the sides 166 of the vane 160. The arcuate wall 169 is downwardly concave and, along with the sides 166, defines a cavity 164 extending along a bottom portion of the vane 160. The bottom of the vane 160 is open and has shoulders 170 extending inward from a lower end of each side 166. A transparent or translucent lens 172 is supported by the shoulders 170 and encloses the cavity 164. A light source is positioned within the cavity 164 and transmits illumination downward through the lens 172. In some configurations, the sides 166, the divider 168, the arcuate wall 169, or combinations thereof may be transparent or translucent to transmit light sidewise, upward, or at various angles therebetween to provide indirect light reflected off of a ceiling surface of the building structure. In these configurations, the lens 172, the lower portions of the sides 166 defining the cavity 164, or both may be replaced by a material that does not transmit light, such as a blackout material or a reflective mirrored surface, to substantially eliminate any direct light from being transmitted from the light source toward the floor of the building structure. The vane 160 illustrated in FIGS. 16 and 17 is illuminated with an elongated fluorescent, LED, or other light bulb 162 mounted in the cavity 164 along the bottom of the vane 160. If desired in a fluorescent system, an elongated chamber (not shown) could also be provided within the vane 160 for receipt of a ballast (not shown) as conventionally used in fluorescent systems.

A fourth example of the present disclosure is shown in FIGS. 18 and 19. In this example, the connector 36 is identical to the connector 36 depicted in FIGS. 1-13, but the vane 174 is again in a different form. The vane 174 illustrated in FIGS. 18 and 19 includes a substantially solid flat panel 186 suspended from the suspending assembly 40 by a top base 176. The top base 176 of the vane 174 connects to the suspending assembly 40 in substantially the same way as the upper base 126 of the vane 32 of the first three examples previously described. Particularly, the top base 176 includes an upwardly opening channel 178 and inturned flanges 180 designed to slidably receive the suspending assembly 40. However, in contrast to the first three examples, the top base 176 also includes a downwardly opening channel 182 defined by spaced side walls 184 into which a reduced width upper edge of the flat panel 186 can be received and secured in position with transverse fasteners 188. The flat panel 186 may be made of any suitable material and of any different color or shape of a material.

FIGS. 20 through 22 illustrate a fifth example of the present disclosure. In this example, the connector 36 is identical to that shown in FIGS. 1 through 13, but the vane 190 is again in a different form. The example vane 190 has two primary components: a base 192 and a panel 194. The base 192 is designed to suspend any desired type of panel 194, such as a flat plate or the like, from the connector 36. The base 192 is probably best illustrated in FIG. 22 as a three-piece structure having a central elongated portion 196 and laterally removable side components 204 and 206. The elongated portion 196 includes inwardly directed side flanges 198 that are integral with a depending section 200 having outwardly directed side flanges 202. The inwardly directed side flanges 198 define inwardly opening upper side channels 198 that receive the suspending assembly 40 of FIGS. 1 through 13. The outwardly directed side flanges 202 support the side components 204 and 206 of the base 192, which are substantially identical. Each of the side components 204 and 206, as seen in FIG. 22, have a horizontal, inwardly directed plate portion 210, inwardly directed flanges 212 and 220, and arcuate outer sides walls 208. The plate portion 210 is adapted to fit beneath the central elongated portion 196 of the base 192 so the smaller flanges 212 along the top of the side components 204 and 206 can be seated on the small flanges 202 of the central portion 196. The large plate 210 of each side component 204 and 206 over and underlay each other and have holes 214 therethrough. A threaded fastener 216 extends through a lower wall 218 of the central portion 196 and the holes 214 of the plates 210 so as to hold the side components 204 and 206 to the central portion 196, as seen in FIG. 21. Beneath the plate 210, each side component 204 and 206 includes a pair of inwardly directed flanges 220 which define a longitudinally extending cavity 222 (FIG. 21) therebetween for suspending a panel 194 of the vane 190. The example panel 194, as seen in FIGS. 19, 21 and 22, is a flat elongated strip of material 224 suspended longitudinally from the three-piece base 192 of the vane 190 by a plurality of horizontally spaced pegs 226. The pegs 226 are positioned adjacent to the upper edge of the panel 194 and are sized to slide along the lower cavity 222 defined by the base 192. Alternatively, the pegs 226 may be sized to fit tightly within the cavity 222 so that the base 192 can be assembled about the panel 194 with the pegs 226 frictionally fitted within the lower cavity 222 during assembly. FIG. 20 shows the entire vane 190, with the three-piece base 192 supporting the lower panel 194, connected to the strut 34 by the connector 36 of FIGS. 1 through 13.

FIGS. 23 and 24 show a sixth example of the present disclosure. The vane 228 is suspended from struts 34 with a connector 36 of the type described in FIGS. 1 through 13 above. The vane 228 has a base 230 defining an upwardly opening channel 232 with inturned flanges 234 adapted to be slidably received on the suspending assembly 40 of the connector 36. The base 230 also includes a vertical strut 236 extending downward from the channel 232 and terminating at a cylindrical body 238. The cylindrical body 238 extends longitudinally along, but is spaced apart from, the channel 232 of the base 230.

The vane 228 extends longitudinally with the base 230. The vane 228 includes a slightly arcuate, plate-like portion 246, a semi-cylindrical base 240, and ribs 244 that connect the plate-like portion 246 to the semi-cylindrical base 240. The cylindrical body 238 of the base 230 is adapted to slidably, but frictionally, receive and support the generally semi-cylindrical upper base 240 of the vane 228. The panel 242 can be pivoted about the cylindrical body 238 of the base 230 between any desired position. Also, the panel 242 can be frictionally retained in any pre-set position, such as those illustrated in solid or dashed lines in FIG. 24. By varying the angle of the panel 242 relative to the base 230, different aesthetics in an entire ceiling system may be obtained and different degrees of vision may be permitted upwardly through the ceiling system. As will also be appreciated, the acoustics and airflow can also be regulated by desired positioning of the panels 242, which would not need to be uniform throughout a ceiling system utilizing this vane 228.

Figure 25:
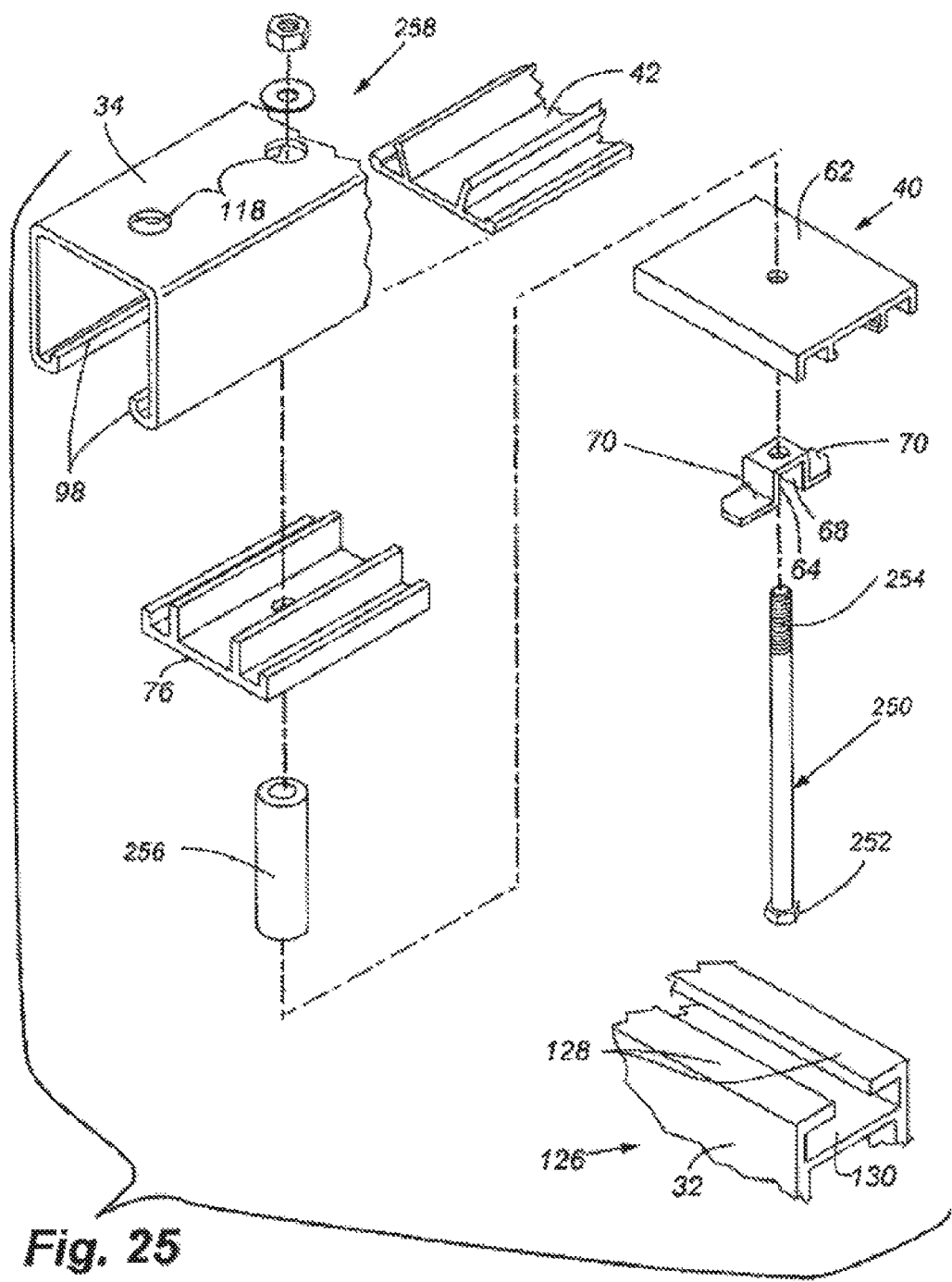
FIG. 25 is an exploded isometric view of a seventh example of the present disclosure showing a threaded rod hanger component.

FIG. 25 shows a seventh example of the present disclosure. Generally, this example is similar to the first example illustrated in FIGS. 1 through 13. The suspension assembly 40 is the same, but the hanger assembly 38 different. In other words, the seventh example of the present disclosure is again adapted to be suspended from a strut 34, but the connector 36 of the example is mounted in a fixed position along the length of the strut 34. The connector 36 is anchored to the strut 34 in a pre-selected hole 118 through the top wall of the strut 34. While the vane could assume numerous configurations, for purposes of illustration, it is shown to be like the vane 32 of the first example.

The connector 36 of the seventh example includes a suspension assembly 40 having the same upper plate 62 and lower body 64 as that of the first example. However, the components of the suspension assembly 40 are mounted on a threaded rod 250 having a hexagonal head 252 at a lower end and a threaded segment 254 at a top end. The threaded rod 250 extends upwardly through the lower body 64 and the upper plate 62 via holes provided therethrough. The lower body 62 is supported on the hexagonal head 252 of the threaded shaft 250. The suspension assembly 40 is connectable to the vane 32 as described in connection with the first example. In other words, the vane 32 is supported by flanges 128 positioned in a slot formed in the upper base 126 of the vane 32. A cylindrical spacer 256 substantially identical to that used in the first example is seated on the top of the upper plate 62. The threaded rod 250 extends through the cylindrical sleeve 256 and through a central opening in the bottom plate 76 of the hanger assembly 38, which is identical to that of the first example.

The bottom plate 76 is again insertable into the strut 34 and is supported on the upturned lips 98 of the strut 34. The bottom plate 76 is slidable along the strut 34, and the central hole extending through the bottom plate 76 may be aligned with a desired or pre-selected hole 118 in the top wall of the strut 34. This alignment can be easily achieved through use of a spacer 42, as described in connection with the first example. Once the bottom plate 76 of the hanger assembly 38 is aligned with a pre-selected hole 118, the threaded rod 250 may be extended upwardly through the aligned hole 118. A nut and washer combination 258 is threadedly received on the upper threaded end 254 of the rod 250 and tightened to positively hold the connector 36 in the pre-selected position. Additionally, a transverse passage may be provided through an upper portion of the threaded segment 254, and a cross pin, such as a hairpin cotter pin, may extend through the transverse passage to prevent the nut from being inadvertently unthreaded from the threaded segment 254. The seventh example of the disclosure may be desirable for use in a ceiling system where the adjustable features provided by the first example are not important and a savings in cost is achievable. A combination of connectors of the seventh example and the first example may also be of benefit depending upon the parameters of the ceiling.

Figure 26:
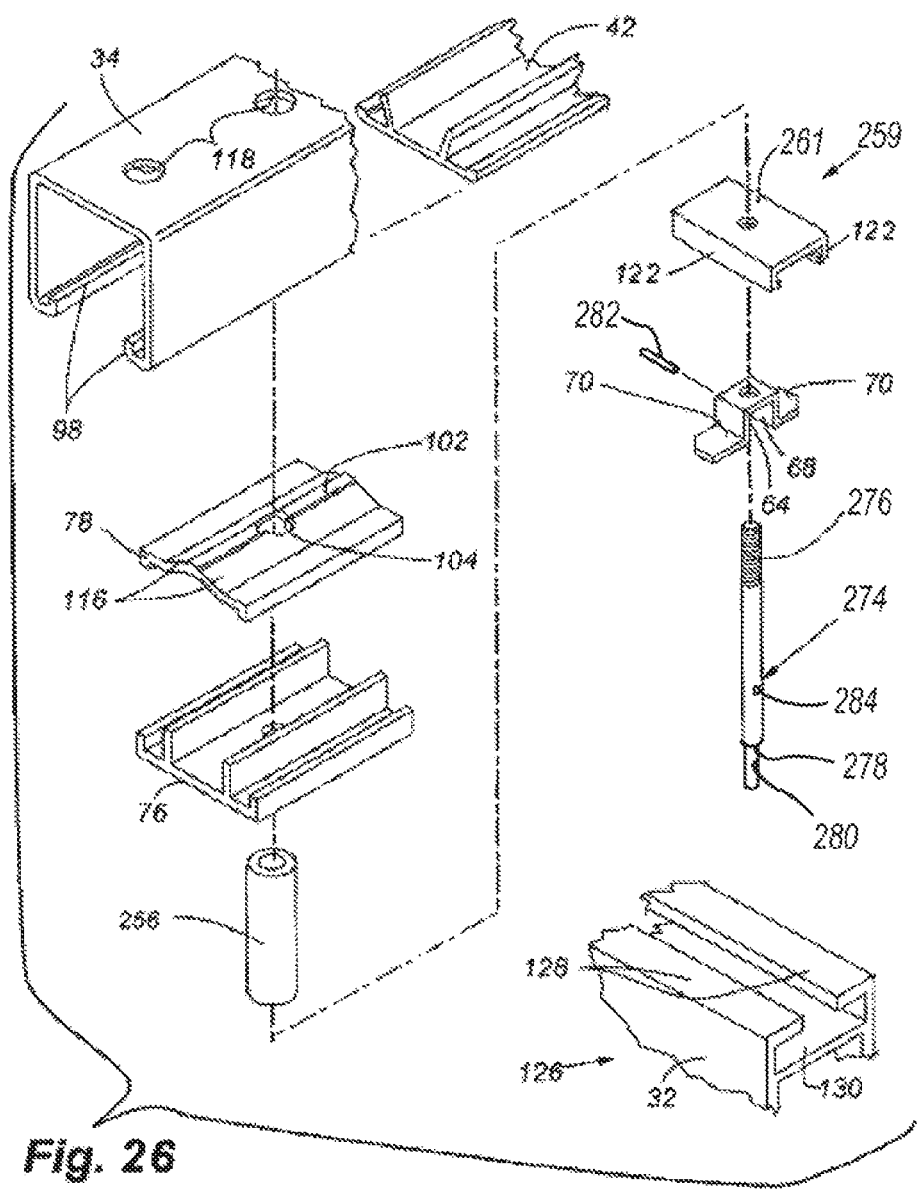
FIG. 26 is an exploded isometric view of an eighth example of the present disclosure showing another threaded rod hanger implementation.

FIG. 26 shows an eighth example of the present disclosure. Generally, this example is similar to the first example illustrated in FIGS. 1 through 13 in that the example connector is adapted to be suspended from a strut 34. The connector includes a suspension assembly 259 having the same lower body 64 as that of the first example, but the upper plate 261 is narrower than that of the first example. The upper plate 261 includes a pair of downwardly directed ribs 122 that overlie a pair of inwardly-extending flanges 128 of a vane 32, which is shown to be like the vane 32 of the first example for purposes of illustrations. The components of the suspension assembly 259 are mounted on a threaded rod 274 having a reduced diameter lower axial extension 278 at a bottom end and a threaded segment 276 at a top end. A first transverse passage 284 extends through the main body of the rod 274, and a second transverse passage 280 extends through the lower axial extension 278. The threaded rod 276 extends upwardly through the lower body 64 and the upper plate 261 via holes provided therethrough and the lower body 62 is supported on a pin 282 extending outwardly from the second transverse passage 280. The length of the pin 282 is dimensioned to rotate within the channel 68 of the lower body 64, thereby allowing the threaded rod 274 to rotate. The suspension assembly 259 is connectable to the vane 32 as described in connection with the first example so that it is supported by flanges 128 disposed in a slot of the upper base 126 of the vane 32.

A cylindrical spacer 256 substantially identical to that used in the first example is seated on the top of the upper plate 261. The threaded rod 274 extends through the cylindrical sleeve 256, through a central opening in the bottom plate 76 of the hanger assembly, and through a central opening 104 in the intermediate plate or catch component 78. The cylindrical sleeve 256, the bottom plate 76, and the catch component 78 are substantially identical to that of the first example except that the opening 104 of the catch component 78 is threaded for engagement with the threaded segment 276 of the rod 274. Similar to the first example, the bottom plate 76 is positionable within the downwardly oriented opening of the strut 34 between the upturned lips 98 of the strut, and the catch component 78 is insertable into the strut 34 so as to be supported on the upturned lips 98 of the strut 34. The bottom plate 76 and the catch component 78 are slidable along the strut 34 until the connector is positioned in a desired location. Once in a predetermined location, the threaded rod 274 can be rotated in a tightening direction about its longitudinal axis to move the catch component 78 down the threaded segment 276 toward the lower axial extension 278, thereby compressing the catch component 78 against the upturned lips 98 of the strut 34 and/or the upwardly extending ribs of the bottom plate 76 via the threaded engagement of the threaded segment 276 of the rod 274 and the threaded opening 104 of the catch component 78. Thus, in the eighth example, the rod 274 can be turned about its longitudinal axis to effectively lock the connector in a desired location relative to the strut 34. The rod 274 may have to be rotated multiple turns to lock the hanger assembly in place along the length of the strut 34. A tool, such as the cylindrical rod 112 depicted in FIGS. 8 through 9 and 12 through 13 may be positioned within the first transverse opening 284 to assist in rotating the rod 274.

To reposition the connector, the rod 274 is rotated in a loosening direction about its longitudinal axis to move catch component 78 up the threaded segment 276 and away from the lower axial extension 278, thereby loosening the connection between catch component 78 and the strut 34 and/or the bottom plate 76 and permitting the connector to be displaced along the length of the strut 34. In the eighth example, the rod 274 may be dimensioned so that an upper end of the threaded segment 276 is disposed within the strut 34 and does not extend through the hole 118, in contrast to the seventh example. Thus, in the eighth example, the connector can be secured to the strut 34 between the holes 118. The threaded segment 276 of the rod 274 may include a left or right hand thread. Similar to the seventh example, a transverse passage may be provided through an upper portion of the threaded segment 276, and a cross pin may extend through the transverse passage to act as a retaining means so that the rod 274 is not inadvertently unthreaded from the threaded opening 104.

Figure 27:
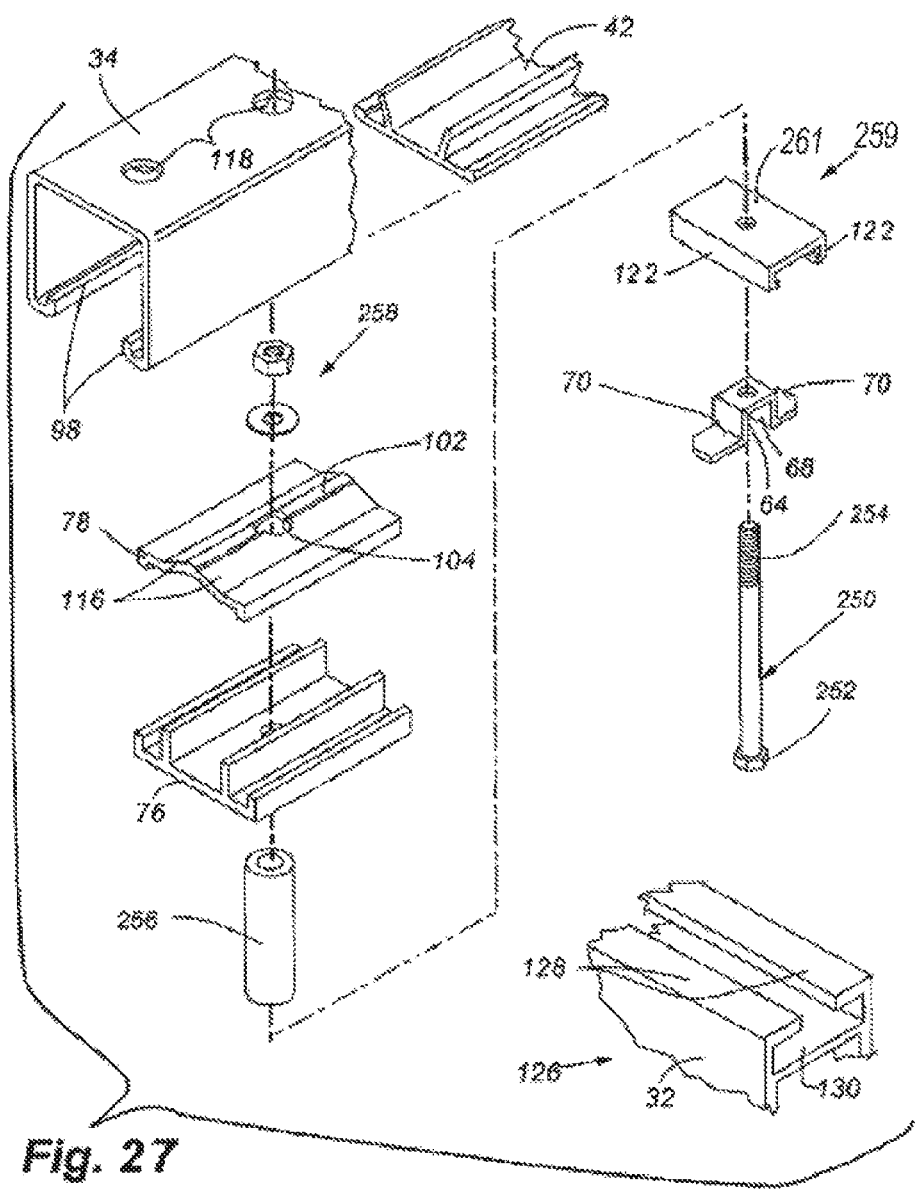
FIG. 27 is an exploded isometric view of a ninth example of the present disclosure showing yet another threaded rod hanger implementation.

FIG. 27 shows a ninth example of the present disclosure. Generally, this example is similar to the seventh and eighth examples illustrated in FIGS. 25 through 26. Similar to the seventh example, the components of the suspension assembly 259 are mounted on a threaded rod 250 having a head 252 at a lower end and a threaded segment 254 at a top end. The threaded rod 250 extends upwardly through the lower body 64 and the upper plate 261 via holes provided therethrough and the lower body 62 is supported on the head 252 of the threaded rod 250. The suspension assembly 259 is connectable to the vane 32 as described in connection with the first example so that it is supported by flanges 128 disposed in a slot of the upper base 126 of the vane 32. However, in FIG. 27, the connector includes a nut and washer combination 258 for threadably engaging the threaded segment 254 of the rod 250 to secure the connector in a pre-selected position along the length of the strut 34. In this example, the nut and washer combination 258 are housed within the strut 34 when the connector is attached to the strut 34. To facilitate tightening and/or removal of the nut, it may be preferable to align the rod 250 with a hole 118 in the top wall of the strut 34 and extend a tool, such as a nut driver, through the hole 118 for interaction with the nut. In some configurations, the washer is not included and only a nut is utilized. Similar to the seventh example, a transverse passage may be provided through an upper portion of the threaded segment 254, and a cross pin may extend through the transverse passage to prevent the nut from being inadvertently unthreaded from the threaded segment 254. In some configurations, the nut may fit tight within the strut 34 so that the nut cannot turn within the strut 34, thereby removing the need for a separate tool.

Figure 28:
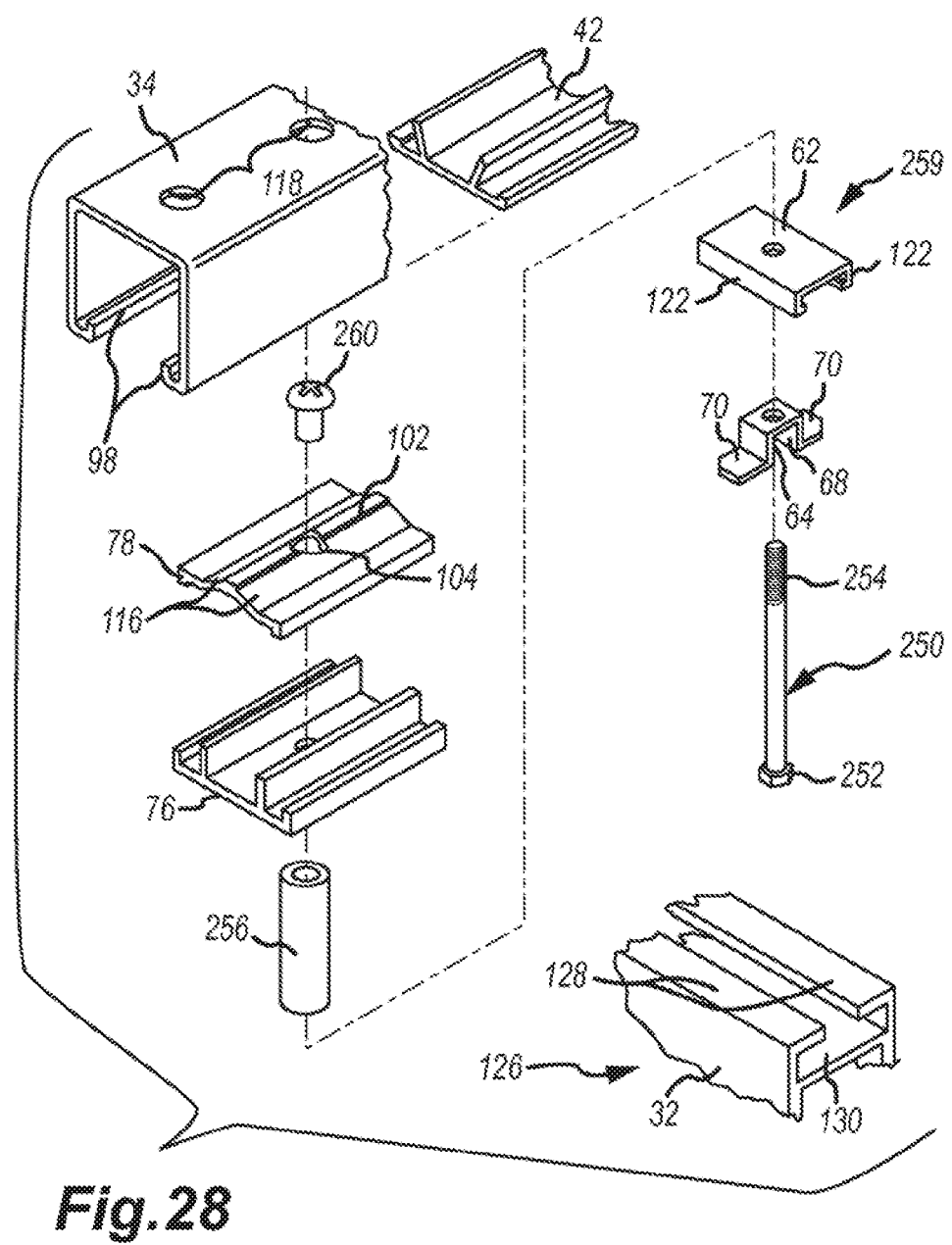
FIG. 28 is an exploded isometric view of a tenth example of the present disclosure showing another threaded rod hanger implementation.

As a further alternative, FIG. 28 shows a tenth example of the present disclosure in which a binding, or barrel, nut 260 is utilized to threadably engage the threaded segment 254 of the rod 250 to secure the connector 36 to the strut 34. The binding nut 260 includes an internally-threaded barrel section sized to receive the threaded segment 254 of the rod 250. The binding nut 260 also includes a head that may be designed for interaction with a standard tool, such as a screwdriver.

Figure 29:
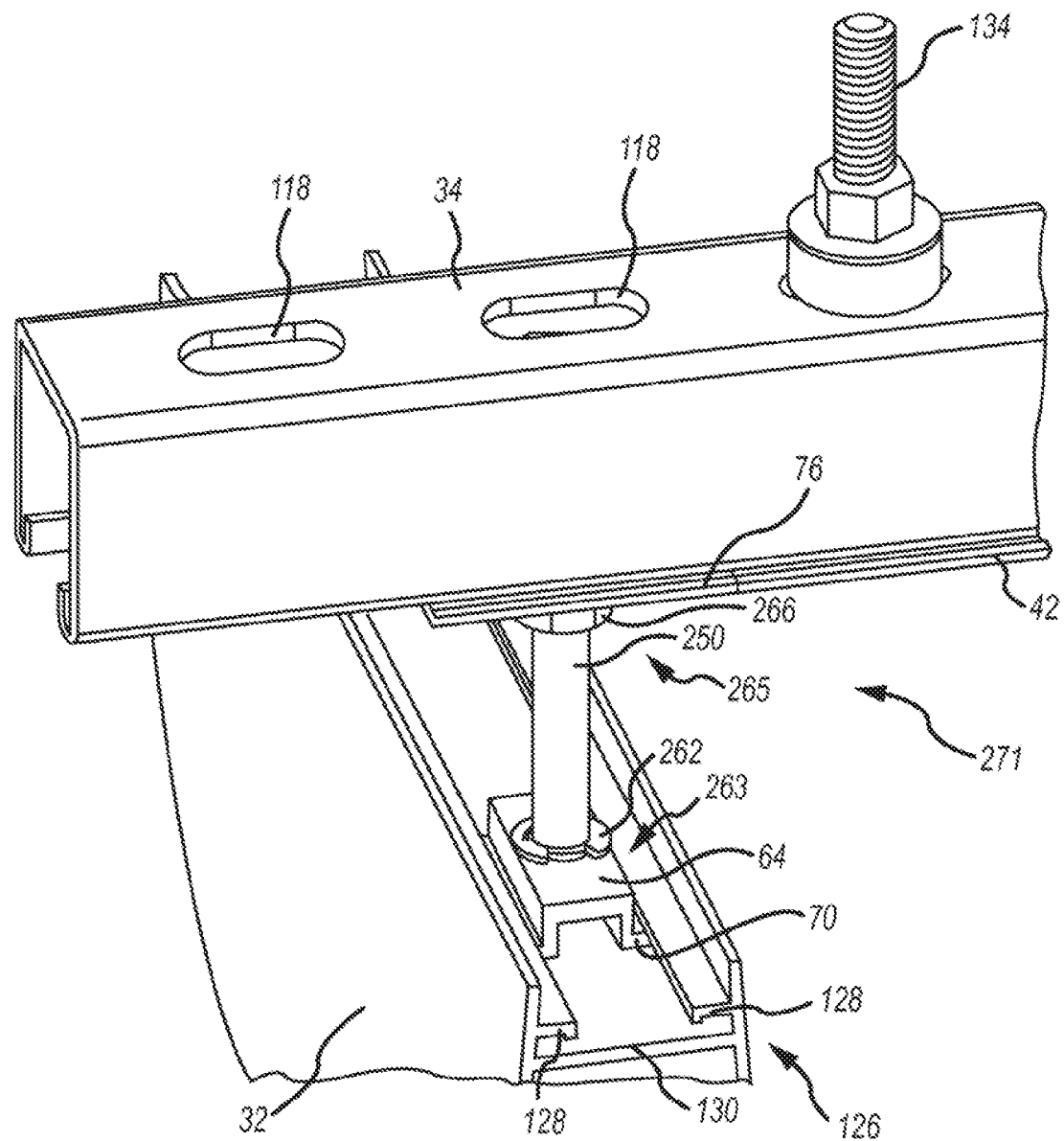
FIG. 29 is a fragmentary top perspective view of an eleventh example of the present disclosure showing a single vane suspended from a supporting strut.
Figure 30:
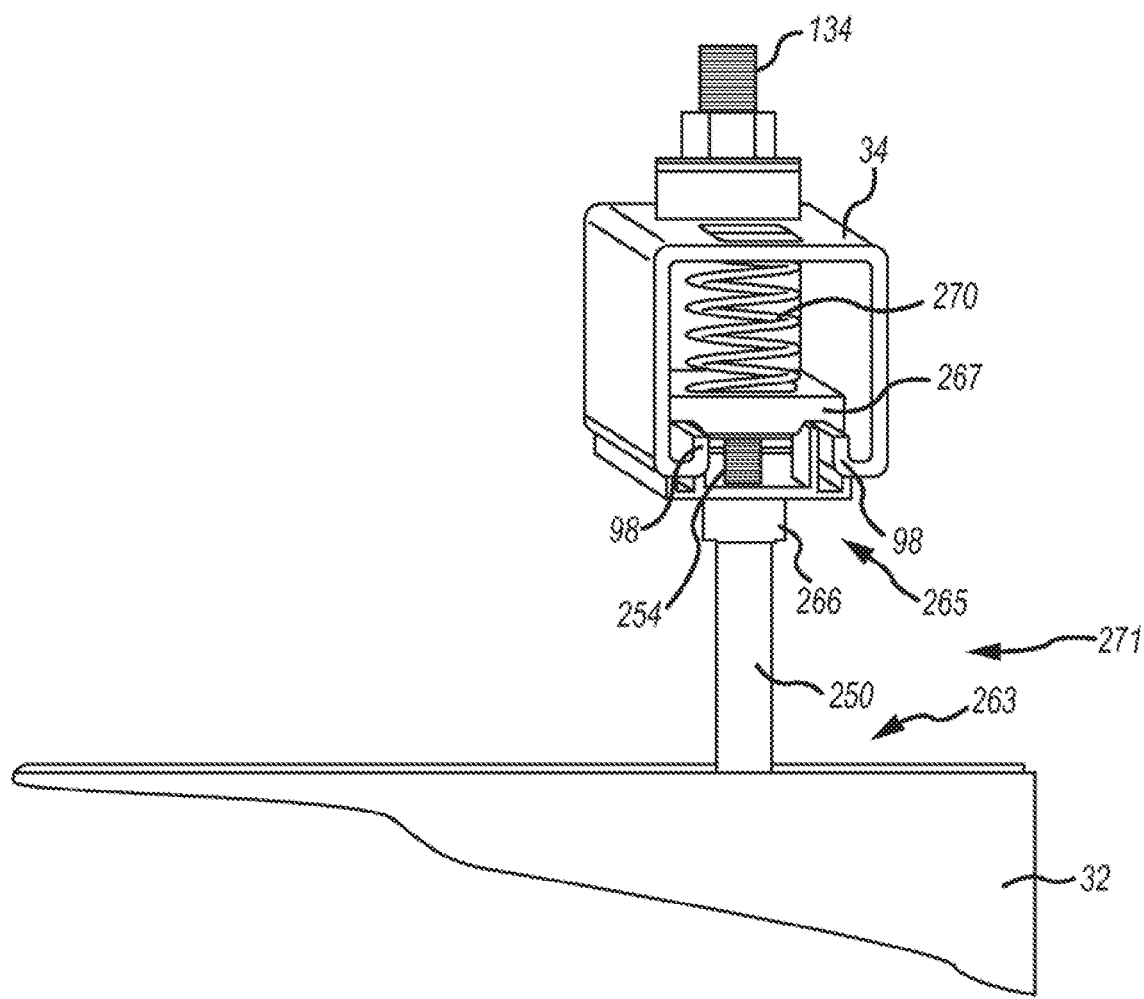
FIG. 30 is a fragmentary end perspective view of the system shown in FIG. 29.
Figure 31:
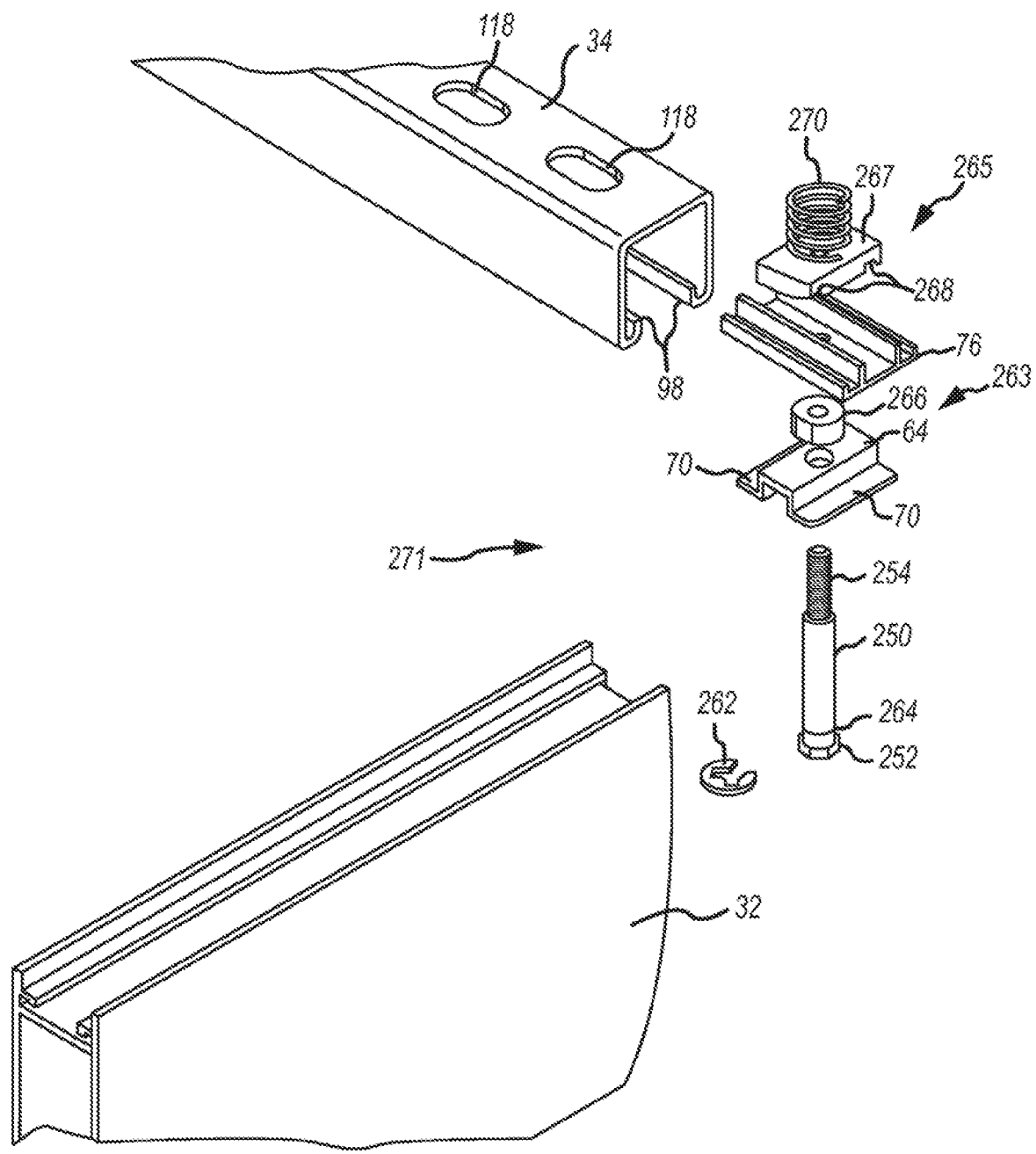
FIG. 31 is an exploded fragmentary isometric view of the system shown in FIG. 29.

Referring to FIGS. 29 through 31, an eleventh example of the present disclosure is provided. Generally, the eleventh example is similar to the first example in that a vane 32 is connected to a strut 34 at a downwardly spaced position from the strut 34 by a connector. The connector 271 depicted in FIGS. 29 through 31 includes a suspension assembly 263 having a lower body 64 with outwardly extending flanges 70 configured to be slidably received in an upper base 126 of a vane 32. As depicted in FIG. 29, the flanges 70 are positioned between a horizontal wall 130 and inwardly extending flanges 128 of the vane 32 to connect the suspension assembly 263 to the vane 32. The components of the suspension assembly 40 are mounted on a threaded rod 250 having a head 252 at a lower end and a threaded section 254 at a top end. The threaded rod 250 extends upwardly through the lower body 64 via a hole provided therethrough and the lower body 64 is supported on the head 252 of the threaded rod 250. A side-mount external retaining ring 262, commonly referred to as an E-style clip, may snap into a groove 264 formed in an outer surface of the shaft 250 to retain the lower body 64 to the shaft 250 between the head 252 and the ring 262. Although the groove 264 is depicted as being formed in the rod 250, in an alternative example a cylindrical spacer 256 substantially identical to that used in the first example may be used and include a groove configured to receive the ring 262. In the eleventh example, the lower body 64 is independently rotatable relative to the rod 250.

The connector depicted in FIGS. 29 through 31 also includes a hanger assembly 265 operably associated with the strut 34 and the rod 250. The hanger assembly 265 includes a bottom plate 76, a nut 266, a catch component 267, and a spring 270. The bottom plate 76 is substantially identical to that of the first example. Beneath the bottom plate 76, a nut 266 is configured to threadably engage the threaded section 254 of the rod 250 and may be locked in place relative to the rod via a thread locking fluid or any other suitable method. Above the bottom plate 76, a catch component 267 having transversely spaced grooves 268 is configured to be inserted into the internal channel of the strut 34. The grooves 268 cooperate with the lips 98 of the strut 34 to allow selective positioning of the connector 271 along the length of the strut 34. The catch component 267 includes a hole 104 sized to receive and threadably engage the threaded section 254 of the rod 250. Additionally or alternatively, a nut may be positioned above the catch component 267 and threaded onto the threaded rod 250 to secure the catch component 267 to the threaded rod 250. A spring 270 may be positioned on a top surface of the catch component 267 and engage an inside top surface of the strut 34 to bias the catch component 267 downward into contact with the upturned lips 98 of the strut 34. A plate or other component may be placed between the spring 270 and the inside top surface of the strut 34 to assist in repositioning the hanger assembly 265 along the length of the strut 34. As an example, the plate may be similar to the catch component 267 and reside on the top of the spring 270 to prevent the spring 270 from interacting with a hole 118 or otherwise binding within the strut 34. The spring 270 is depicted as a compression spring, although other types of suitable springs may be used.

To connect the vane 32 to the strut 34, the threaded rod 250 is inserted through the opening of the lower body 64 until the head 252 abuts a lower surface of the lower body 64, the retaining ring 262 is snapped into the groove 264 associated with the rod 250 to retain the lower body 64 on the threaded rod 250, and the flanges 70 of the lower body 64 are slid into slots formed in the upper base 126 of the vane 32. The catch component 267 and the spring 270 are inserted into the strut 34 to a desired location along its length, and the bottom plate 76 is positioned beneath the catch component 267 so that their center holes are aligned. The threaded segment 254 of the rod 250 is then threaded into the nut 266, inserted through the bottom plate 76, and threaded into the catch component 267. Once assembled, the rod 250 and/or the nut 266 can be rotated to tighten and/or loosen the hanger assembly 38 to restrict or permit movement of the hanger assembly 265 along the length of the strut 34. While the vane could assume numerous configurations, for purposes of illustration, the vane shown in the eleventh example resembles the vane 32 of the first example.

The examples provided herein generally disclose a new and improved system for suspending vanes from supporting struts within the ceiling of a building structure. Each vane is suspended below a strut by a plurality of connectors. Each connector includes a hanger assembly and a suspending assembly. Each hanger assembly connects to a supporting strut of the building structure and may be slid along the length of the strut to a desired position. Spacers may be positioned between individual hanger assemblies to set a predetermined spacing between the hanger assemblies (and thus the vanes). Once at a desired position, each hanger assembly may be locked or secured in place. A suspending assembly is positioned below each hanger assembly and is connected to the hanger assembly with a rod, shaft, or other suitable component. The suspending assembly connects a vane to the hanger assembly. The suspending assembly may be slidably received within the vane to permit repositioning of the vane relative to the suspending assembly. The vanes can assume many different forms including, but not limited to, an interior pouch, a flat panel, illuminated, pivotal, or combination thereof.

Although the present disclosure has been described with a certain degree of particularity, it is understood the disclosure has been made by way of example. For example, various features of the disclosure are grouped together in one or more examples or configurations for the purpose of streamlining the disclosure. However, it should be understood that various features of the certain examples or configurations of the disclosure may be combined in alternate examples or configurations. In addition, it should be understood that changes in detail or structure may be made without departing from the spirit of the disclosure as defined in the appended claims.

The foregoing description has broad application. For example, while the examples disclosed herein have been discussed in relation to a certain strut configuration, it should be appreciated that the concepts disclosed herein may equally apply to other building structures utilized in drop ceiling applications. Similarly, while the examples disclosed herein have been discussed in relation to a few types of vanes, it should be appreciated that the concepts disclosed herein may equally apply to various vane configurations. Further, although the disclosure has been presented as a series of examples, the components or features discussed in relation to any example may be combined with components or features in any other example to form different arrangements. Accordingly, the discussion of any example is meant only to be explanatory and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary. Also, reference herein is made to the vane being "fixed" or "secured" to the strut by the connector assembly in a releasable manner. This characterization is intended to include that when fixed or secured, the vane may not be moved from its position, as well as the vane may be moved with force along the strut when secured in this manner.

What is claimed is:

1. A connector for suspending a vane from a strut of a building ceiling structure, the strut including first and second upturned lips defining a downwardly opening channel along a bottom side of the strut, the connector comprising:
   a rod including a top end and a bottom end, the rod configured to be operably coupled to the strut adjacent the top end of the rod;
   at least one hanger component coupled to the rod, the at least one hanger component comprising a lower plate configured to be partially received within the downwardly opening channel of the strut when the rod is operably coupled to the strut, the lower plate comprising a plate portion extending along an exterior of the strut and first and second ribs extending from the plate portion into the downwardly opening channel such that the first rib is positioned adjacent to a first side of the downwardly opening channel and the second rib is positioned adjacent to an opposed second side of the downwardly opening channel, the at least one hanger component further comprising a catch plate configured to be positioned within an interior of the strut such that a portion of the strut is positioned between the catch plate and the lower plate when the rod is coupled to the strut, the catch plate defining first and second grooves spaced apart from each other along a bottom face of the catch plate; and
   at least one suspending component positioned adjacent the bottom end of the rod and configured to be operably coupled to the vane;
   wherein:
   when the rod is operatively coupled to the strut, the first groove is configured to receive the first upturned lip of the strut and the first rib of the lower plate and the second groove is configured to receive the second upturned lip of the strut and the second rib of the lower plate;
   the plate portion defines a width between opposed lateral ends of the plate portion; and
   the width of the plate portion is greater than a channel width of the downwardly opening channel defined between the first and second upturned lips of the strut such that the plate portion extends along the bottom side of the strut beyond the opposed first and second sides of the downwardly opening channel.

2. The connector of claim 1, wherein:
   the first upturned lip is spaced apart from the second upturned lip such that the first upturned lip defines the first side of the downwardly opening channel and the second upturned lip defines the second side of the downwardly opening channel; and
   the first rib extends directly adjacent to the first upturned lip along the first side of the downwardly opening channel and the second rib extends directly adjacent to the second upturned lip along the second side of the downwardly opening channel.

3. The connector of claim 1, wherein a portion of the rod defined between the top and bottom ends of the rod extends through both the lower plate and the downwardly opening channel and into an interior of the strut.

4. The connector of claim 3, wherein:
   the strut includes a top wall positioned opposite the downwardly opening channel; and
   the rod further extends through an opening defined in the top wall of the strut to allow the rod to be coupled to the top wall of the strut.

5. The connector of claim 1, wherein the catch plate defines a rod opening through which a portion of the rod is received within the interior of the strut.

6. The connector of claim 1, wherein the catch plate is configured to be slid along the first and second upturned lips when the first and second upturned lips are received within the first and second grooves, respectively, to allow the connector to be selectively positioned along a length of the strut.

7. The connector of claim 1, wherein the first and second ribs are vertically insertable into the downwardly opening channel from the bottom side of the strut.

8. The connector of claim 1, wherein
   each of the first and second upturned lips defines a top edge; and
   the first and second grooves are recessed relative to the bottom face of the catch plate such that the bottom face is positioned below the top edges of the first and second upturned lips when the first and second upturned lips are received within the first and second grooves, respectively.

9. A connector for suspending a vane from a strut of a building ceiling structure, the strut defining a downwardly opening channel, the connector comprising:
   a rod including a top end and a bottom end;
   at least one hanger component positioned adjacent the top end of the rod and configured to be operably coupled to the strut, the at least one hanger component comprising a catch plate insertable within an interior of the strut, the catch plate defining at least one groove configured to receive at least one wall of the strut defining at least a portion of the downwardly opening channel of the strut, the catch plate configured to be slid along the at least one wall at an interface defined between the at least one groove and the at least one wall to selectively position the catch plate along a length of the strut, the at least one hanger component further comprising a lower plate configured to be positioned at least partially exterior to the strut such that a portion of the strut is clamped between the catch plate and the lower plate when the catch plate and the lower plate are assembled relative to the strut, the lower plate including a plate portion extending along an exterior of the strut and first and second ribs extending from the plate portion into the downwardly opening channel of the strut such that the first rib is positioned adjacent to a first side of the downwardly opening channel and the second rib is positioned adjacent to an opposed second side of the downwardly opening channel; and
   at least one suspending component positioned adjacent to the bottom end of the rod and configured to be operably coupled to the vane;

wherein:
a width of the plate portion is greater than a channel width of the downwardly opening channel of the strut such that the plate portion extends along the bottom side of the strut beyond the opposed first and second sides of the downwardly opening channel; and
the first and second ribs are vertically insertable into the downwardly opening channel from the bottom side of the strut.

10. The connector of claim 9, wherein:
the at least one groove comprises first and second grooves spaced apart from each other along a bottom face of the catch plate;
the at least one wall of the strut comprises a first upturned lip and a second upturned lip; and
the first and second grooves are configured to receive the first and second upturned lips, respectively.

11. The connector of claim 10, wherein:
each of the first and second upturned lips defines a top edge; and
the first and second grooves are recessed relative to the bottom face of the catch plate such that the bottom face is positioned below the top edges of the first and second upturned lips when the first and second upturned lips are received within the first and second grooves, respectively.

12. The connector of claim 10, wherein the first and second upturned lips are oriented substantially perpendicular relative to the bottom face of the catch plate.

13. The connector of claim 10, wherein:
the first upturned lip is spaced apart from the second upturned lip such that the first upturned lip defines the first side of the downwardly opening channel and the second upturned lip defines the second side of the downwardly opening channel; and
the first rib extends directly adjacent to the first upturned lip along the first side of the downwardly opening channel and the second rib extends directly adjacent to the second upturned lip along the second side of the downwardly opening channel.

14. The connector of claim 9, wherein a portion of the rod defined between the top and bottom ends of the rod extends through both the lower plate and the downwardly opening channel and into an interior of the strut.

15. The connector of claim 14, wherein:
the strut includes a top wall positioned opposite the downwardly opening channel; and
the rod further extends through an opening defined in the top wall of the strut to allow the rod to be coupled to the top wall of the strut.

16. A connector for suspending a vane from a strut of a building ceiling structure, the strut defining a downwardly opening channel along a bottom side of the strut, the connector comprising:
a rod including a top end and a bottom end, the rod configured to be operably coupled to the strut adjacent the top end of the rod;
at least one hanger component coupled to the rod, the at least one hanger component comprising a lower plate configured to be partially received within the downwardly opening channel when the rod is operably coupled to the strut, the lower plate comprising a plate portion extending along an exterior of the strut and first and second ribs extending from the plate portion and into the downwardly opening channel of the strut such the first rib is positioned adjacent to a first side of the downwardly opening channel and the second rib is positioned adjacent to an opposed second side of the downwardly opening channel; and
at least one suspending component positioned adjacent the bottom end of the rod and configured to be operably coupled to the vane;
wherein:
the plate portion defines a width between opposed lateral ends of the plate portion;
the width of the plate portion is greater than a channel width of the downwardly opening channel of the strut such that the plate portion extends along the bottom side of the strut beyond the opposed first and second sides of the downwardly opening channel;
each of the first and second ribs extends from the plate portion and terminates at a respective end; and
a width of the lower plate defined directly between the ends of the first and second ribs is less than the channel width defined between the opposed walls such that the first and second ribs are vertically insertable into the downwardly opening channel and between the opposed walls from the bottom side of the strut.

17. The connector of claim 16, wherein the at least one hanger component further comprises a catch plate configured to be positioned within an interior of the strut such that a portion of the strut is positioned between the catch plate and the lower plate when the rod is coupled to the strut.

18. The connector of claim 17, wherein:
the strut comprises a first upturned lip and a second upturned lip spaced apart from the first upturned lip;
the first upturned lip defines the first side of the downwardly opening channel and the second upturned lip defines the second side of the downwardly opening channel;
the catch plate defines first and second grooves spaced apart from each other along a bottom face of the catch plate; and
when the rod is operatively coupled to the strut, the first groove is configured to receive the first upturned lip of the strut and the second groove is configured to receive the second upturned lip of the strut.

19. The connector of claim 18, wherein the first groove is further configured to receive the first rib of the lower plate and the second groove is further configured to receive the second rib of the lower plate.

20. The connector of claim 18, wherein
each of the first and second upturned lips defines a top edge; and
the first and second grooves are recessed relative to the bottom face of the catch plate such that the bottom face is positioned below the top edges of the first and second upturned lips when the first and second upturned lips are received within the first and second grooves, respectively.

* * * * *